United States Patent [19]

Enami et al.

[11] Patent Number: 4,991,019
[45] Date of Patent: Feb. 5, 1991

[54] DIGITAL VIDEO SIGNAL PROCESSING SYSTEM

[75] Inventors: Kazumasa Enami; Nobuyuki Yagi; Ryoichi Yajima; Kiyomasa Kanai; Shigemi Mikami, all of Tokyo; Nobuyuki Sasaki, Kawasaki; Kazuhiro Harukawa, Yokohama; Kouji Hoshino, Yokohama; Yuji Konno, Yokohama, all of Japan

[73] Assignees: Nippon Hoso Kyokai, Tokyo; Kabushiki Kaisha Toshiba, Kawasaki, both of Japan

[21] Appl. No.: 308,306

[22] Filed: Feb. 9, 1989

[30] Foreign Application Priority Data

| Feb. 12, 1988 | [JP] | Japan | 63-30391 |
| Feb. 12, 1988 | [JP] | Japan | 63-30392 |
| Feb. 12, 1988 | [JP] | Japan | 63-30393 |
| Mar. 4, 1988 | [JP] | Japan | 63-51205 |
| Mar. 4, 1988 | [JP] | Japan | 63-51206 |
| Mar. 4, 1988 | [JP] | Japan | 63-51207 |
| Mar. 17, 1988 | [JP] | Japan | 63-61987 |
| Mar. 17, 1988 | [JP] | Japan | 63-61988 |
| Mar. 17, 1988 | [JP] | Japan | 63-61989 |
| Mar. 17, 1988 | [JP] | Japan | 63-61990 |

[51] Int. Cl.⁵ ............................................. H04N 5/14
[52] U.S. Cl. ............................. 358/160; 358/185
[58] Field of Search ............ 358/21 R, 22, 160, 183, 358/185

[56] References Cited

U.S. PATENT DOCUMENTS

| 4,485,402 | 11/1984 | Searby | 358/160 |
| 4,642,694 | 2/1987 | Yamagishi et al. | 358/160 |
| 4,677,470 | 6/1987 | Cooper et al. | 358/160 |
| 4,679,085 | 7/1987 | Johnson et al. | 358/160 |
| 4,774,578 | 9/1988 | Kick | 358/160 |

FOREIGN PATENT DOCUMENTS 61-84178 4/1986 Japan.

OTHER PUBLICATIONS

Yagi et al., "Chip Set for Real-Time Video Signal Processing", pp. 237-240, IAPR Workshop on CV—Special Hardware and Industrial Applns., Oct. 12-14, 1988.

*Primary Examiner*—John W. Shepperd
*Assistant Examiner*—Michael D. Parker
*Attorney, Agent, or Firm*—Oblon, Spivak, McClelland, Maier & Neustadt

[57] ABSTRACT

In a digital video signal processing system disclosed, a plurality of programmable processor units (21(01) to 21(16)) each receive two different video signals, process the video signal in accordance with a program, and output the result of the signal processing. A network section (20) receives the output data signals from the plurality of programmable processor units (21(01) to 21(16)) and a plurality of video signals (A1, A2) from exterior, and supplies the received signals to the plurality of programmable processor units (21(01) to 21(16)), and leadouts any one of the produced signals or input video signals. The network section (20) is capable of freely altering a connection pattern of the plurality of programmable processor units (21(01) to 21(16)). The programmable processor units (21(01) to 21(16)) may have signal processing functions as defined by applied programs.

12 Claims, 18 Drawing Sheets

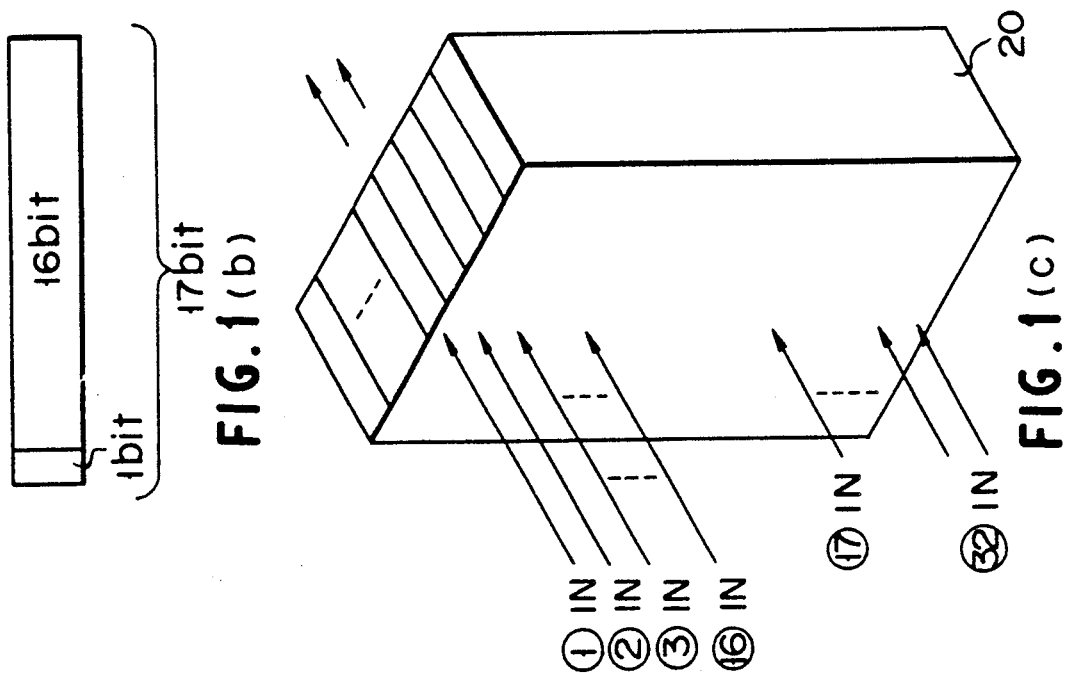
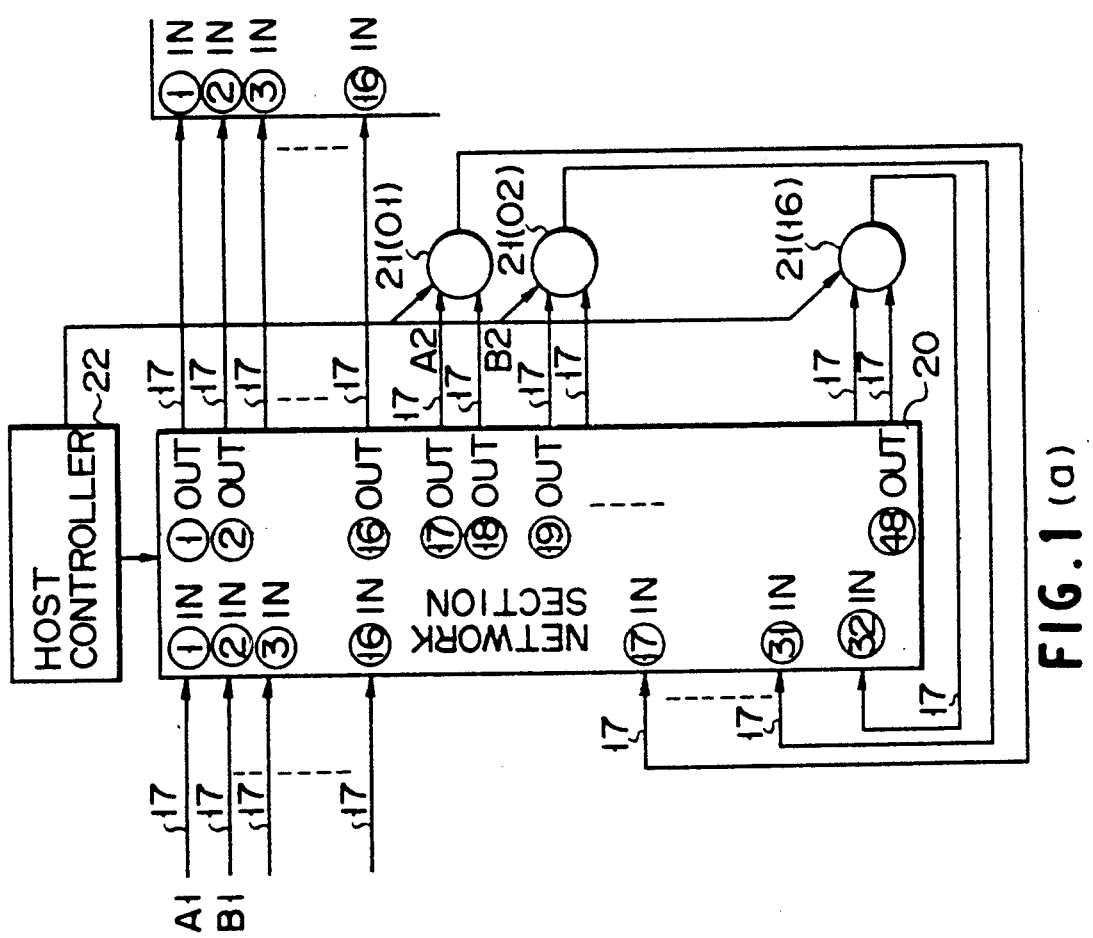
FIG. 1(a)
FIG. 1(b)
FIG. 1(c)

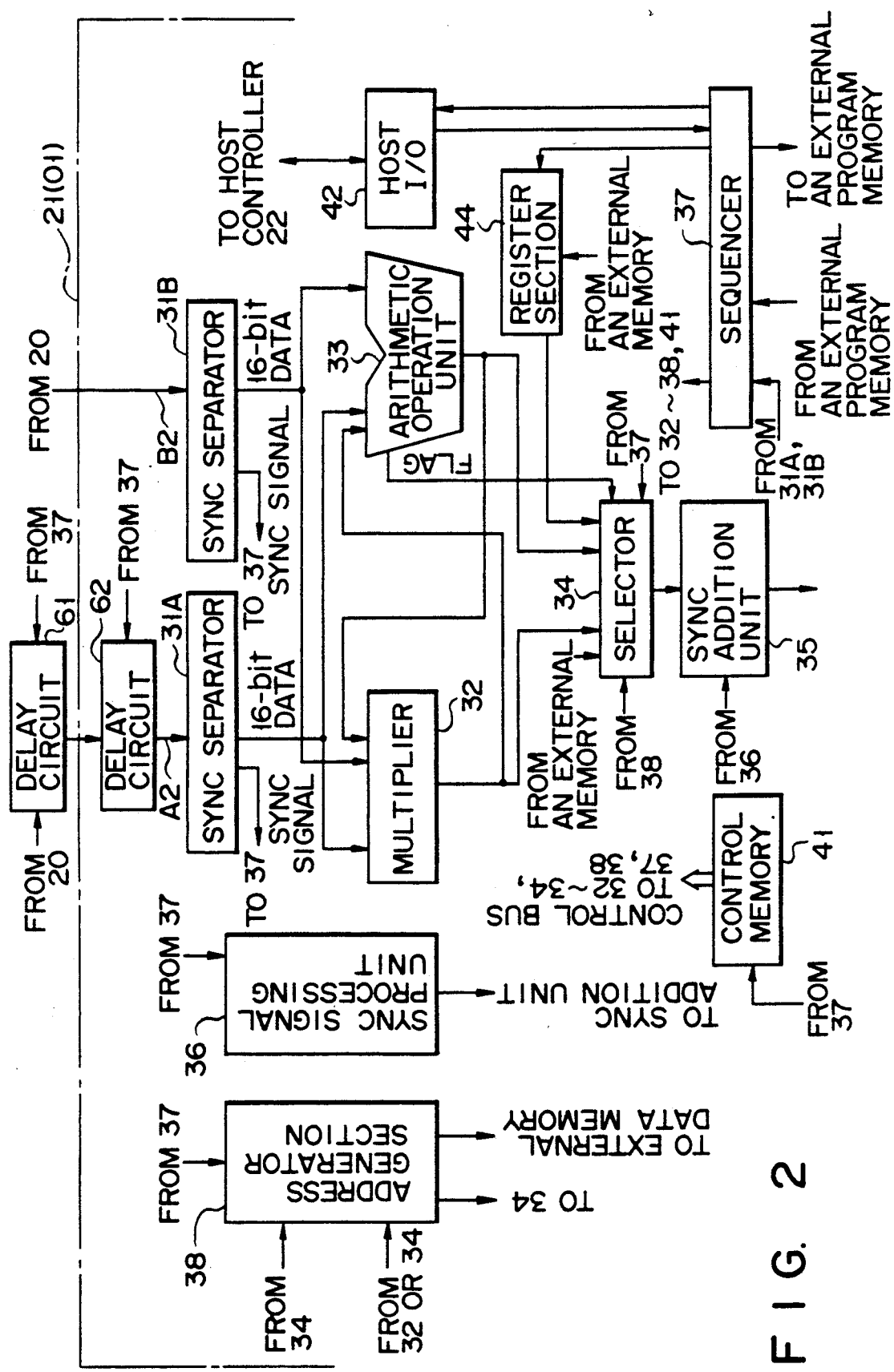
F I G. 2

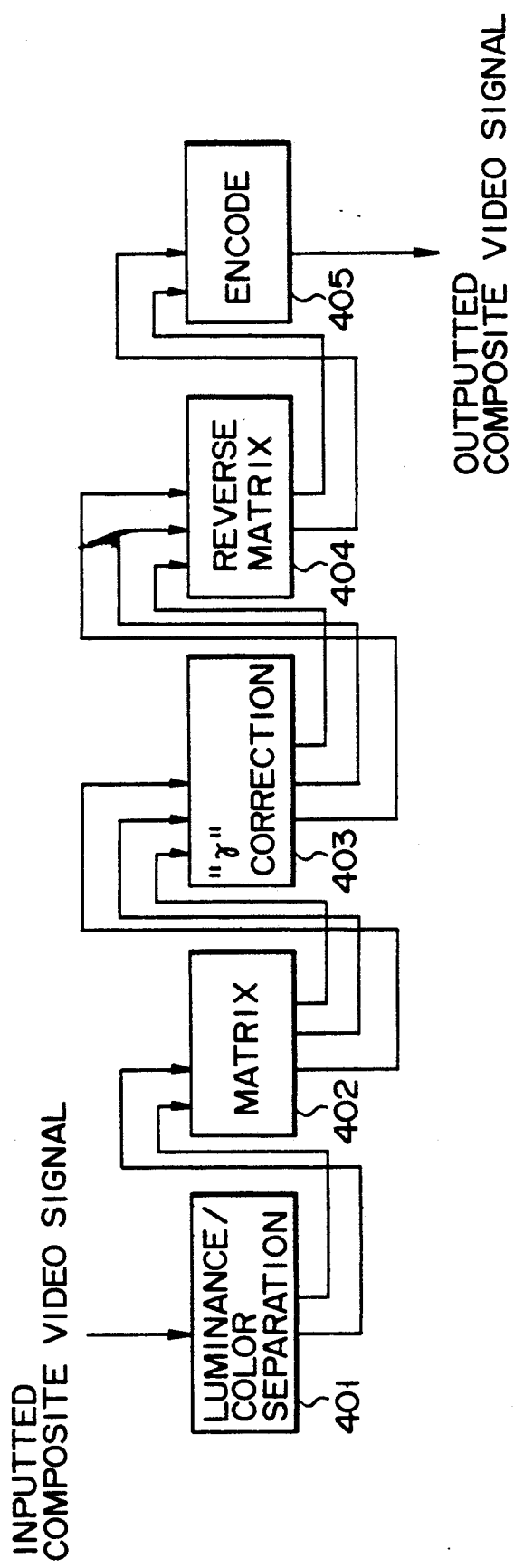
F I G. 6

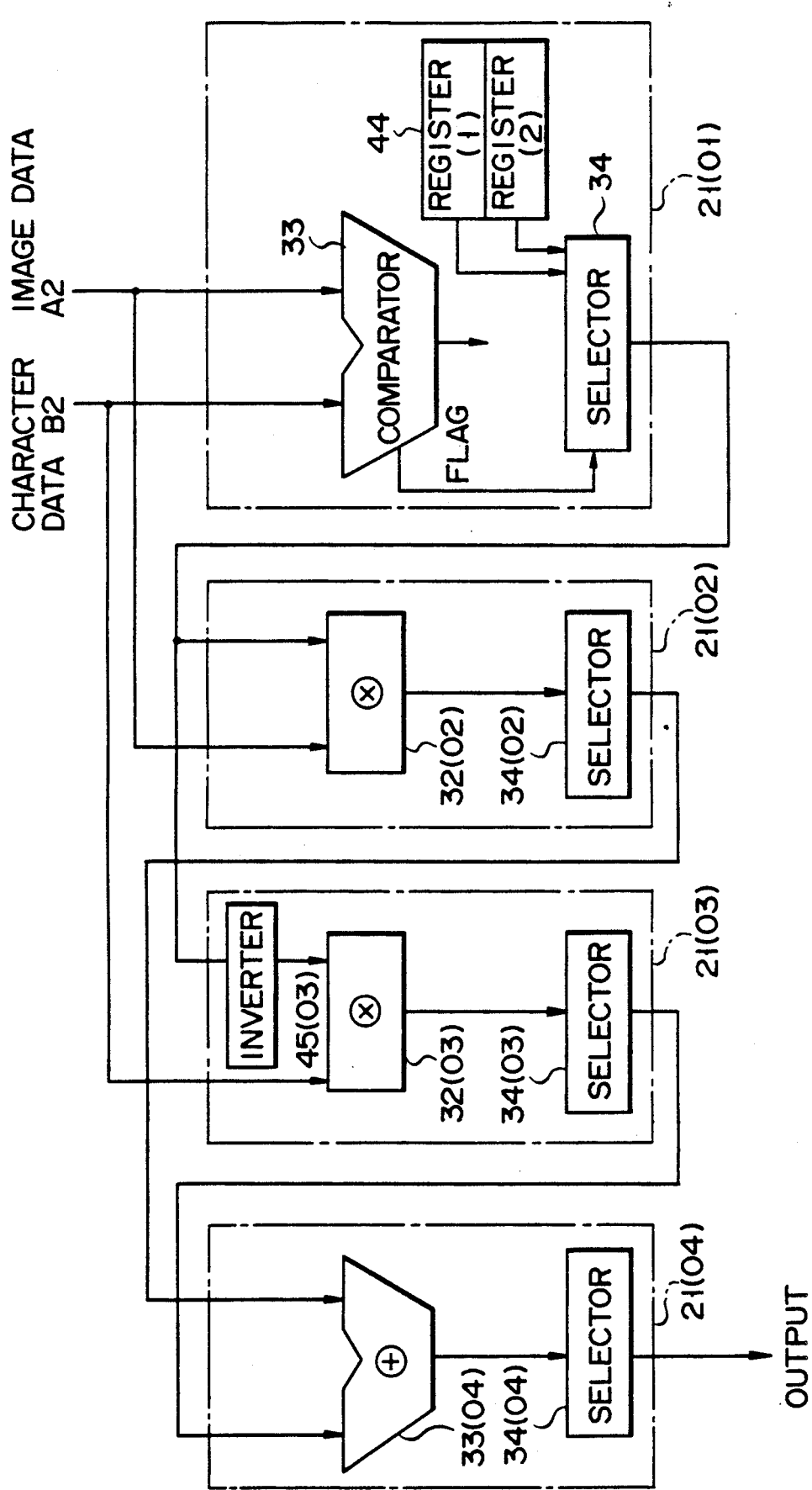
F I G. 8

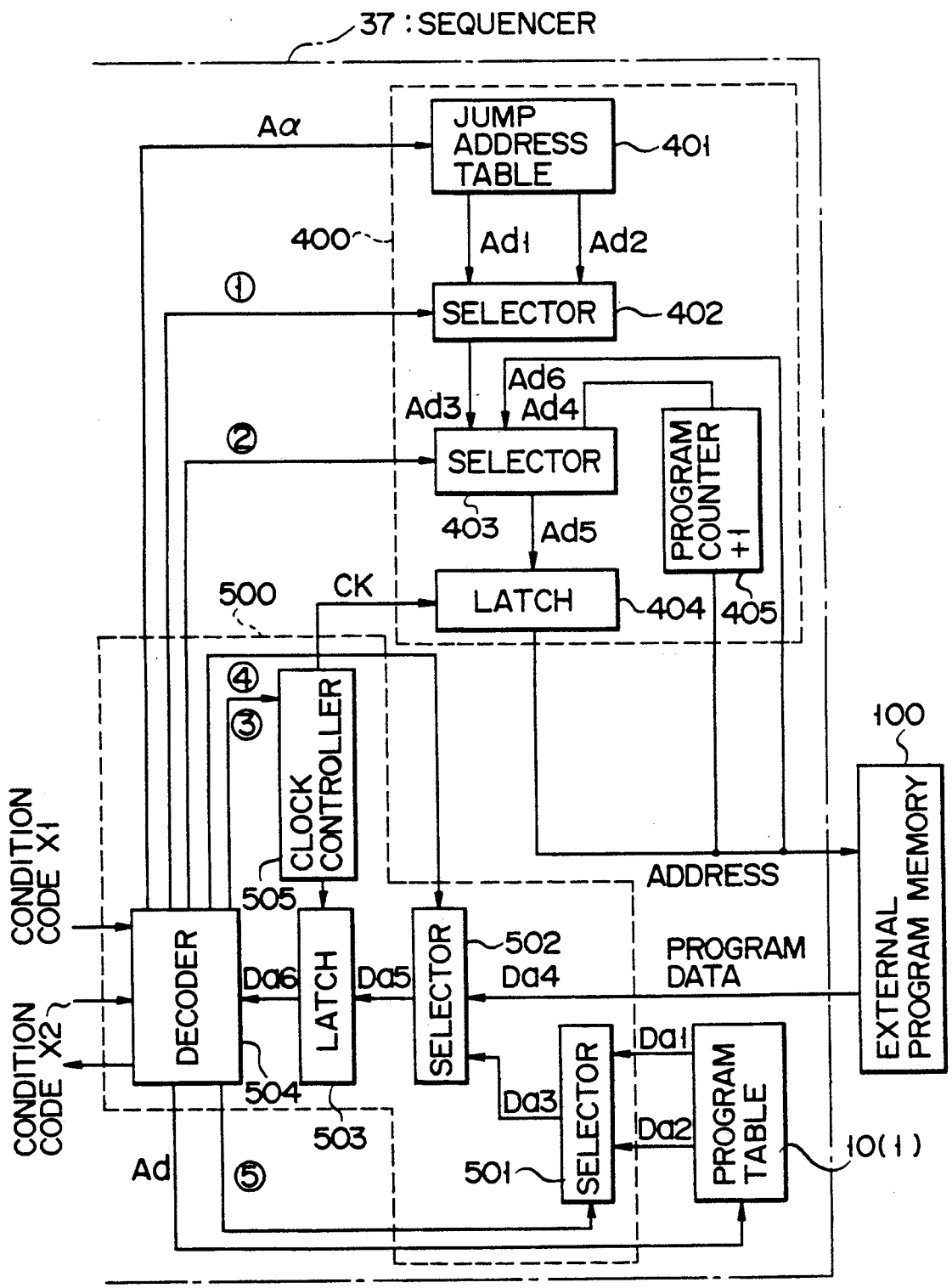
F I G. 14

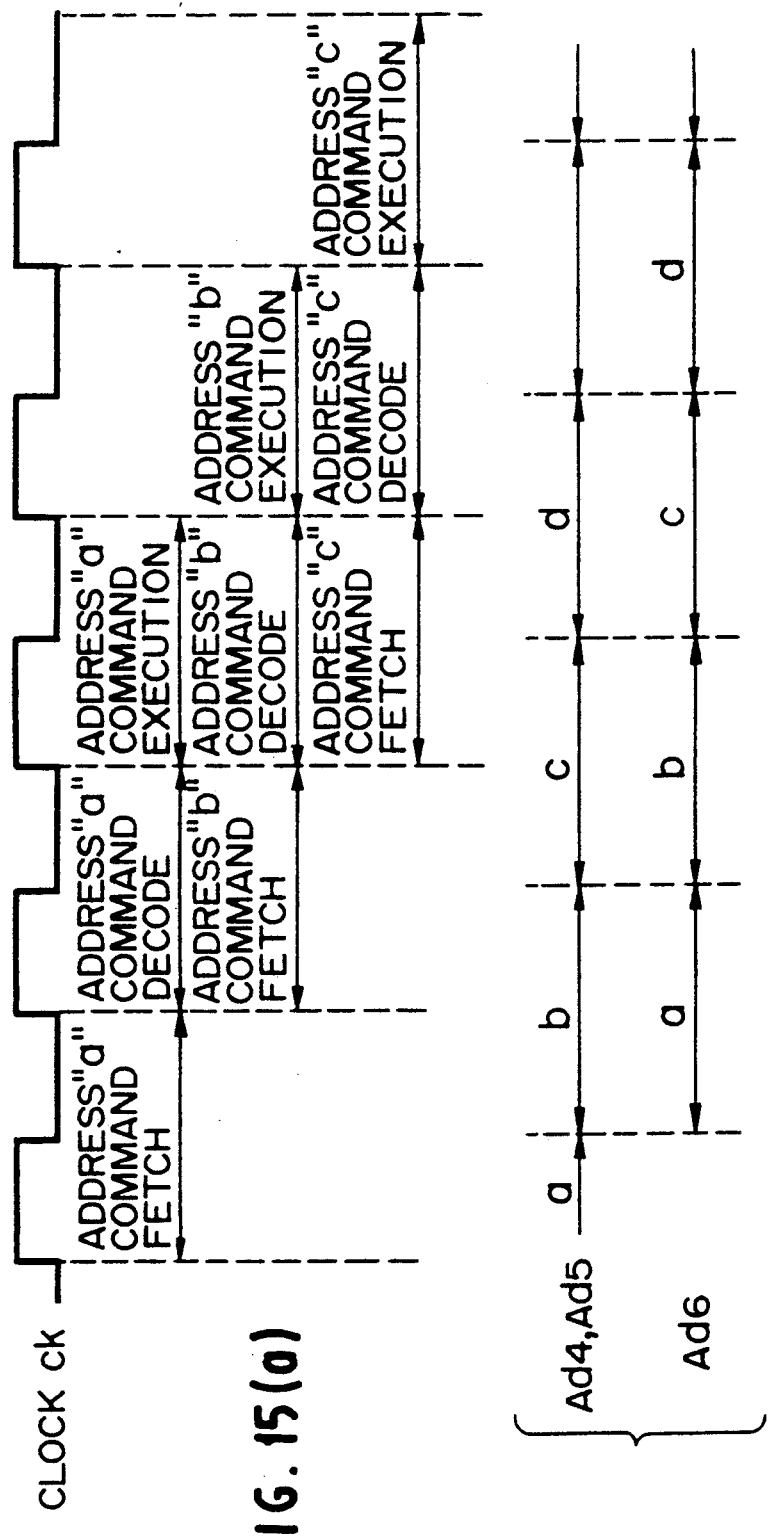

DIGITAL VIDEO SIGNAL PROCESSING SYSTEM

BACKGROUND OF THE INVENTION

Field of the Invention

The present invention relates to a digital video signal processing system in use for broadcasting signal processing equipment in a broadcasting station, for example.

Generally, a digital video signal processing system installed in a broadcasting station is made up of individual units with different signal processing functions. In this type of the system, the signal processing may be categorized into the following three items A to C.

(A) Picture quality correction

Gamma (γ) correction, color correction, noise reduce, contour correction (B) Image effects Dissolve (Dis), Super, Wipe, shrink, enlargement, rotation, chromakey (C) Image processing Luminance/color separation, luminance/color combining, sync separation In a conventional broadcasting equipment, the digital processing system is assembled into a plurality of units. Each unit contains circuitry having the signal processing function as indicated by each of the above items. With such an assemblage, the larger the number of items, the larger the number of units. In this case, therefore, the broadcasting equipment becomes a large system as a whole. Design and maintenance of such a large system is complicated and difficult. Additional difficulties exist in setting up an intended system by combining those units.

SUMMARY OF THE INVENTION

Accordingly, an object of the present invention is to provide a digital video signal processing system which is multi-functionally operable under control of programs externally applied thereto.

Another object of the present invention is to provide a digital video signal processing system which uses programs externally applied, or requires no physical connection work, for setting up a network for systematically combining respective processor units to obtain desired video data processing function.

To achieve the above object, there is provided a digital video signal processing system comprising: a plurality of programmable processor units for processing a plurality of supplied video signals in accordance with programs and for outputting the results of the processings; a network section for receiving the output signals from the programmable processor units and a plurality of video signals externally applied, selecting any of those input signals and applying the selected signal to the plurality of programmable processor units; and a control unit for changing the processing functions of the plurality of processor units and for altering connections between the input and output of the network section.

Other objects, features, and advantages of the present invention will be apparent when carefully reading the detailed description in connection with the accompanying drawings, in which:

BRIEF DESCRIPTION OF THE DRAWINGS

FIG. 1(a) is a block diagram schematically showing a configuration of a digital video signal processing system according to the present invention;

FIG. 1(b) is a view showing a format of a digital video signal used in the video signal processing system of FIG. 1(a);

FIG. 1(c) is an external view showing the video signal processing system of FIG. 1(a);

FIG. 2 is a block diagram of one of programmable processor units used in the video signal processing system of FIG. 1(c);

FIG. 6 is a block diagram showing yet another video signal processing circuit formed by the digital video signal processing system of FIG. 1(a);

FIG. 8 is a block diagram showing a further video signal processing circuit formed by the digital video signal processing system of FIG. 1(a);

FIG. 14 is a block diagram showing an arrangement of a sequencer used in the processor unit of FIG. 2;

FIGS. 15 through 17 show timing charts useful in explaining the operation of the sequencer of FIG. 14;

DETAILED DESCRIPTION OF THE PREFERRED EMBODIMENTS

Figure 3A:
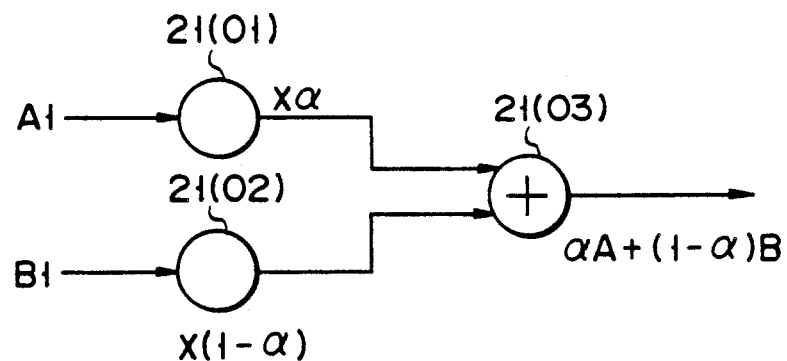
FIG. 3(a) is a video processing signal flow for combining video signal two video signals by the digital video signal processing system of FIG. 1(a)

Description of an Overall System FIG. 1

An overall system of a digital video signal processing system according to an embodiment of the present invention will be described with reference to FIG. 1.

As shown, network section 20 is provided with 32 inputs (1)IN to (32)IN. Each input allows data of 17-bit long to pass therethrough. Inputs (1)IN and (2)IN receive digital video signals A1 and B1 respectively. Network section 20 is further provided with outputs (1)OUT to (48)OUT. Each output allows data of 17-bit long to pass therethrough The 17th to 48th outputs (17)OUT to (48)OUT are paired in such a way that the 17th and 18th outputs (17)OUT and (18)OUT are paired, and the 19th and 20th outputs (19)OUT and (20)OUT are paired, and so on. Each pair of outputs is coupled with a corresponding programmable processor unit. For example, a pair of the 17th and 18th outputs (17)OUT and (18)OUT is coupled with data processor unit 21(01). Another pair of outputs (19)OUT and (20)OUT is connected to processor unit 21(02). The outputs of programmable processor units 21(01) to 21(16) are coupled with the 17th to 32nd inputs (17)IN to (32)IN of network section 20, respectively.

The outputs (1)OUT to (16)OUT of network section 20 produce final video signals or supply video signals to a similarly configured network section in the next stage.

Host controller 22 containing a host computer, for example, controls an overall system of the digital video signal processing system.

FIG. 1(b) shows a format of a digital video signal used in the video signal processing system. In this instance, the video signal consists of 17 bits, one bit used for a sync identification flag and the remaining 16 bits for video data or the data of a sync signal including a horizontal sync signal and a vertical sync signal. For example, when the sync identification flag is "1", the remaining bits represent sync data. When it is "0", the data bits represent video data.

Network section 20 is made up of 9 LSIs arrayed on a board, which cooperate to form a matrix circuit. For the 18-bit inputs and outputs, 2 bits are assigned to each LSI, making it easy to wire the inputs and outputs to one LSI. Network section 20 contains a network controller to control the matrix circuit. The network controller operate in response to a command from host controller 22 to programmably alter a connection of the matrix circuit. Details of network section 20 will be given later with reference to FIG. 7.

Processor Unit FIG. 2

Details of processor units 21(01) to 21(16) will be given with reference to FIG. 2. In the description to follow, processor unit 21(01) will be described as a typical example. This unit is fabricated into an LSI.

Network section 21(01) may supply to processor unit 21(01), the paired digital video signals A1 and B1 externally supplied or paired video signals supplied from another processor unit in accordance with the requirements of a current control mode, or it may supply a single video signal to processor unit 21(01) if required by a current control mode.

In this instance, the digital video signals applied to the processor unit are the paired digital video signals A1 and B1. The word, "video signal", means a digitized video signal component or a digitized video sync component (horizontal and vertical sync signals) of the composite video signal formatted as shown in FIG. 1(b).

Processor unit 21(01) has two inputs for receiving paired video signals A2 and B2. The inputs are coupled with sync separators 31A and 31B, respectively.

The video sync signals separated by sync separators 31A and 31B, and 1-bit identification flags (FIG. 1(b)) are inputted to sequencer 37. The sequencer determines an operation sequence of processor unit 21(01) on the basis of one of the sync identification flags and one of the video sync signals. Alternatively, the operation sequence may be determined by a system sync signal supplied from a system clock generator additionally provided (not shown). Further, sequencer 37 adjusts the timings of processing video signals A2 and B2 with reference to the sync identification flags and video sync signal of video signals A2 and B2.

When the input timings of video signals A2 and B2 to processor unit 21(01) must be adjusted, sequencer 37 supplies a delay control signal to delay circuit 61 or 62. In response to this control signal, delay circuit 61 or 62 delays video signal A2 and supplies the delayed signal to processor unit 21(01). An input time difference between video signals A2 and B2 has been measured in the adjusting stage after a signal processing system had been set up. Delay circuit 62 is for fine adjustment of the input time difference, and contained in the LSI chip. Delay circuit 61 adjusts for large time differences which cannot be covered by delay circuit 62.

The control signal output terminals of sequencer 37 are connected to the respective circuit blocks in processor unit 21(01).

The outputs of sync separators 31A and 31B for outputting the 16-bit video data separated by those separators are connected to multiplier 32 and arithmetic operation unit 33. Multiplier 32 multiplies the two types of video data or it multiplies one of the video data by a constant or variable. Arithmetic operation unit 33 adds the two types of video data or subtracts one of the video data from the other, or it adds a value to one of the video data or subtracts a value from the same. Further, it compares the video data with a value, and produces the comparison result.

The output of multiplier 32 is connected to the input of arithmetic operation unit 33, and vice versa. The outputs of multiplier 32 and operation unit 33 are coupled with selector 34.

Selector 34 selects one of the data signals outputted from multiplier 32 and operation unit 33, and supplies the selected data signal to sync addition unit 35. The sync addition unit 35 adds a sync identification flag to the video data or stops the outputting of the processed signal. When the 1-bit sync identification flag is "1", the remaining 16 bits represent known sync data, i.e., a horizontal sync signal or a vertical sync signal, and therefore the sync data automatically may be generated by sync addition unit 35. Selector 34 and sync addition unit 35 also operate under control of control pulses from sequencer 37.

In synchronism with timing pulses from sequencer 37, sync signal processing unit 36 forms a sync identification flag so that the final output data of processor unit 21(01) becomes the 17-bit data formatted as shown in FIG. 1(b), and supplies it to sync addition unit 35. In other words, at the time of outputting of the video data from multiplier 32 or arithmetic operation unit 33, sync signal processing unit 36 appropriately forms and outputs a 1-bit sync identification flag.

Address generator section 38 generates an address to access an external data memory (image memory) in synchronism with a video signal to be processed by processor unit 21(01), for example. Accordingly, address generator section 38 operates in synchronism with timing pulses derived from sequencer 37. Address generator section 38 makes an access to the external data memory when processor unit 21(01) fetches a video signal from the external data memory or when the video signal processed by processor unit 21(01) is written into the external data memory. For example, when the video signal from processor unit 21(01) is written into the external data memory, address generator section 38 may generate addresses to obtain special effects such as reduction and enlargement of image size.

While the video signals inputted to the processor unit are video signals A1 and B1 in the instance described above, sometimes an initial value of the image address data to access the data for the special effects is read out from the external data memory and is set in the address generator section 38 of processor unit 21(01). In a special case, the image address data processed by another processor unit is inputted to address generator section 38, through the input of processor unit 21(01) and multiplier 32 or arithmetic operation unit 33. As for checking if address data has been inputted, if the system is designed that address data is present during a period after a video sync signal is inputted to processor unit 21(01), when address data arrives, it may be loaded into address generator section 38. An initial value from an external program memory may be set in address generator section 38 through sequencer 37 or image address data may be set in the same, from multiplier 32 or arithmetic operation unit 33. The whole processor unit 21(01) may be used as an address generator, if a program to effect such is set in sequencer 37. The reason for this is that processor unit 21(01) is so designed that gates (not shown) are properly inserted among the respective circuit blocks and are enabled and disabled by control signals derived from sequencer 37. Address generator section 38 will be given in detail later with reference to FIGS. 11A and 11B.

Processor unit 21(01) further contains control memory 41. Under control of sequencer 37, control memory 41 stores control data (control signal) from an external program memory. In other words, control memory 41 prestores basic commands for control multiplier 32, arithmetic operation unit 33, selector 34, sync signal processing unit 36, and address generator section 38. Some types of video signal processings require no alteration of program. If the system is designed such that when a fixed arithmetic operation is repeatedly executed, a multiplying program is read out from an external program memory at system clock periods, a large memory area is required for the external program memory. It is for this reason that predetermined commands for respective circuit blocks are stored in control memory 41, to reduce a program read time. When the commands stored in control memory 41 are executed, these are simultaneously loaded upon completion of storing the commands for multiplier 32 or arithmetic operation unit 33 into control memory 41. The address generating processing by address generator section 38 may be enumerated one of those predetermined processings. The processing is to return the generated address to an initial value when a sync signal, for example, arrives, and to increment the address value until the next sync signal arrives. The control memory 41 will be described in detail with reference to FIG. 10.

Processor unit 21(01) additionally contains host interface (host I/O) 42. This host I/O 42 constitutes a data path between processor unit 21(01) and external host controller 22. When the function of the digital video signal processing system, for example, is determined, host controller 22 stores a program to realize the function into an external memory (program memory), through host I/O 42 and sequencer 37. One encounters a situation that parameters necessary for the video signal processing must be altered, host controller 22 stores the altered parameters into the external memory, through host I/O 42 and sequencer 37. Further, data, paragraph and commands may be stored in the register per se in host I/O 42. For further details of this host I/O 42, carefully read the description given later in connection with FIG. 9.

Register section 44 for storing a plurality of predetermined multiplier factors is further provided in processor unit 21(01). Register section 44 is loaded with multiplier factors from the external memory. The output data from register section 44 is outputted through selector 34 when arithmetic operation unit 33 supplies a flag to selector 34. Use of register section 44 will be described in detail with reference to FIG. 8.

While a hardware configuration of processor unit 21(01) has been described, the remaining processor units 21(02) to 21(16) have each exactly the same configuration, and may have various functions depending on the programs used.

The present invention is basically configured as mentioned above.

Combining of Video Signals FIG. 3

Figure 3B:
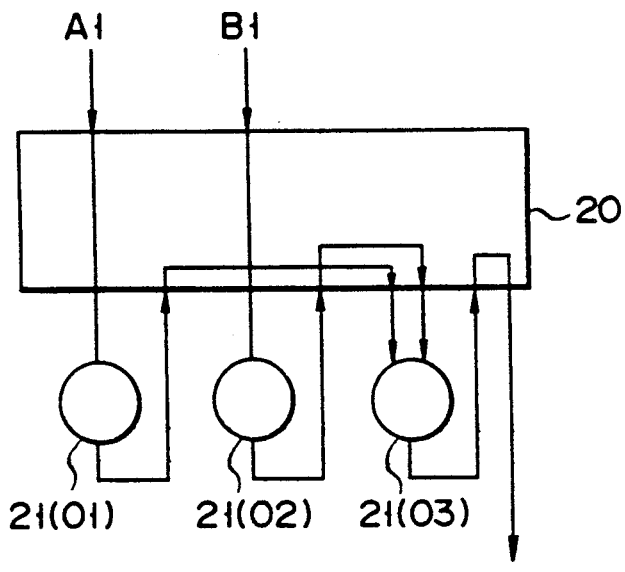
FIG. 3(b) shows a wiring diagram of a network section to form the video signal processing circuit of FIG. 3(a)

How different video signals are combined by using the above system will be described with reference to FIG. 3. In this case, network section 20 sets up a connection of processor units 21(01) to 21(03), as shown in FIG. 3. External video signal A1 is inputted to processor unit 21(01) where it is multiplied by α, while another external video signal B1 is multiplied by (1-α) in processor unit 21(02). The output signals of processor units 21(01) and 21(02) are added together in processor unit 21(03). In the operation to combine video signals, the multipliers are driven in processor units 21(01) and 21(02), and the arithmetic operation unit is driven in processor unit 21(03). Remember that those processor units 21(01) to 21(03). each have the same circuit configuration as that of FIG. 2. FIG. 3(a) is a schematic illustration of a video signal combining circuit. FIG. 3(b) shows a wiring pattern of network section 20 when the video signal combining circuit is formed.

Network section 20 may provide various connections of processor units 21(01) to 21(16) in accordance with the types of video signal processings.

Figure 4A:
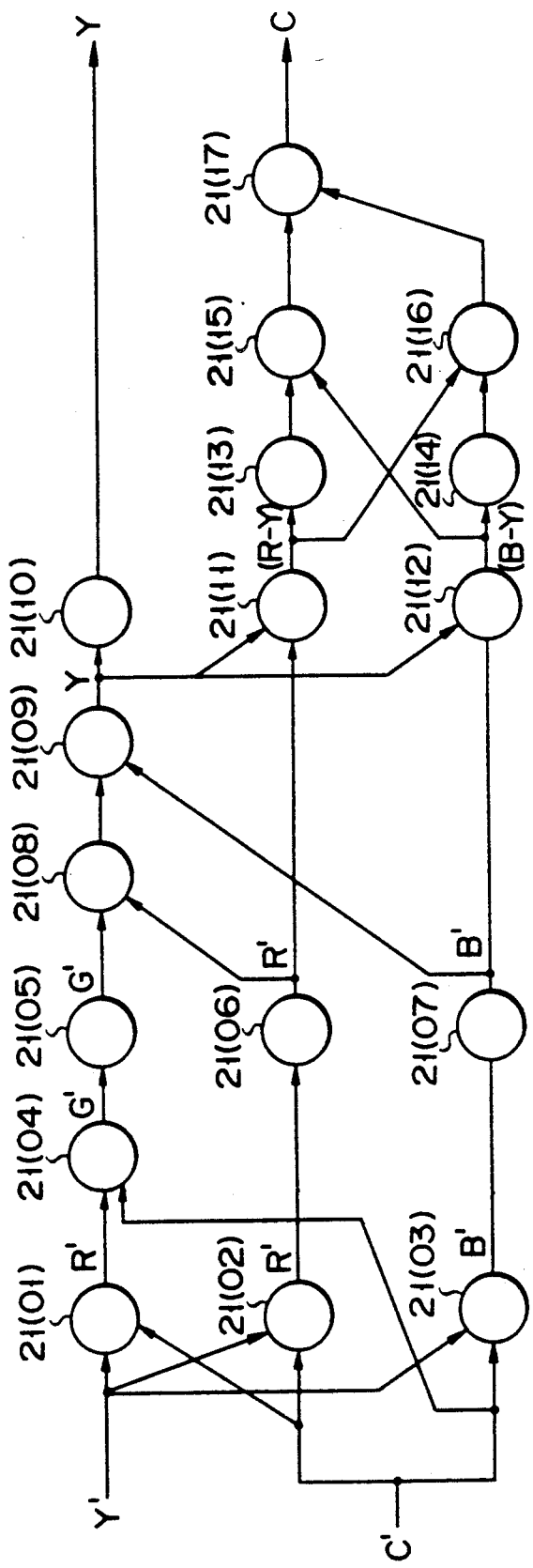
FIG. 4(a) is a block diagram showing another video signal processing signal flow color correction by the digital video signal processing system of FIG. 1(a)
Figure 4B:
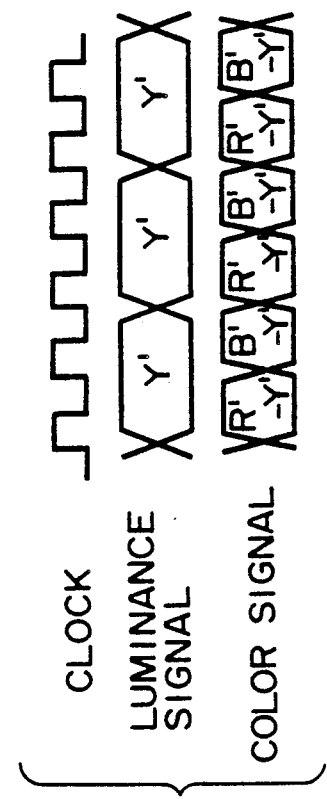
FIG. 4(b) shows a timing diagram useful in explaining the operation of the video signal processing circuit of FIG. 4(a)
Figure 5:
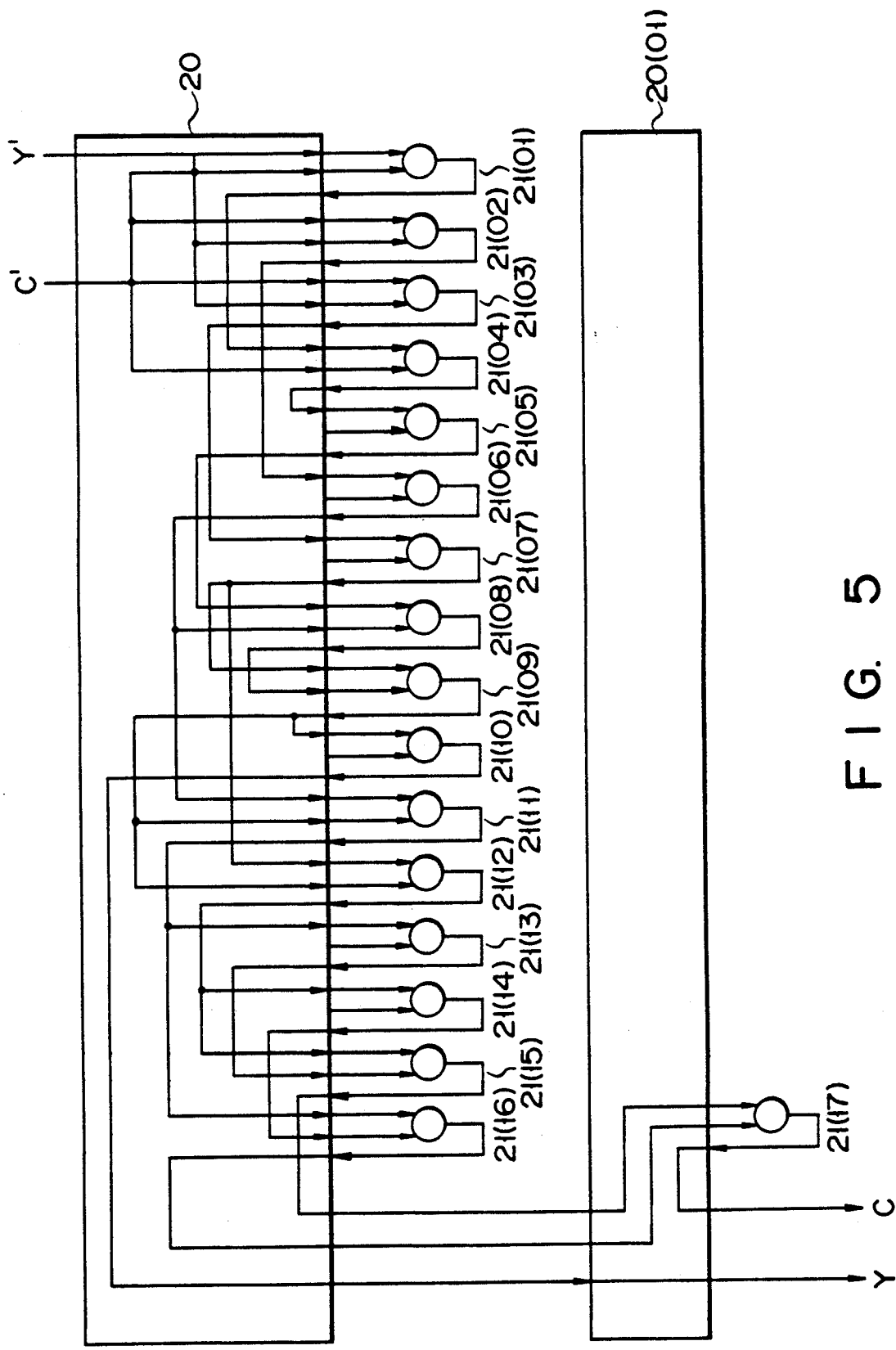
FIG. 5 shows a wiring diagram of a network section to form the video signal processing circuit of FIG. 4(a)

Color Correction System FIGS. 4 and 5

A color correction system constructed by the digital video signal processing system of FIG. 1, will be described with reference to FIG. 4.

As shown, luminance signal Y' and color signal C' are applied to processor units 21(01) to 21(03) by way of network section 20. In the processor units, those signals are subjected to matrix operations. Specifically, in processor units 21(01) and 21(02), luminance signal Y' is multiplied by color signal C', to from signal R'. In processor unit 21(03), luminance signal Y' is multiplied by color signal C', to provide signal B'. Signal R' from processor unit 21(01) is further multiplied by color signal C' in processor unit 21(04). Processor unit 21(04) produces the product as signal G'.

Those signals G', R', and B' are further multiplied by coefficients in processor units 21(0), 21(06) and 21(07), respectively, effecting a color correction. Processor units 21(08) and 21(09) combine three primary color signals derived from processor units 21(05), 21(06) and 21(07), to form luminance signal Y. Processor unit 21(11) combines luminance signal Y and red signal R' to produce a color difference signal (R-Y). Processor unit 21(12) combines luminance signal Y and red signal B' to produce a color difference signal (B-Y). Luminance signal Y is subjected to a gain control processing by processor unit 21(10) and then is outputted from the processor unit. Processor units 21(13) to 21(16) adjust hue and saturation of a color by adjusting an arrangement of the (R-Y) and (B-Y) signals, and the output signals of processor units 21(15) and 21(16) are combined by succeeding processor unit 21(17) as a filter, and outputted as color signal C. Filter 21(17) has the same circuit configuration as that of the processor unit of FIG. 2. A suitable succeeding processor unit may be used for the filter.

Luminance signal Y' and color signal C' are interrelated as shown in FIG. 4(b). Color difference signals (R'-Y') and (B'-Y') alternately appear with respect to time. Accordingly, the first stage processor units 21(02) and 21(03) fetch color signal C at the interval of one period of a clock signal. Consequently, signal R' is derived from processor unit 21(02) and signal B', from processor unit 21(03).

To achieve the above color correction system, network section 20 provides a wiring connection in connection with processor units 21(01) to 21(16), and processor unit 21(17) for the succeeding network section 20(01), as shown in FIG. 5. In FIGS. 1 and 5, like portions are designated by like reference symbols, for simplicity. If an insufficient number of processor units to construct a desired video signal processing system are contained for one network section, a processor unit or units from another network section may be used. In this instance, the processor unit 21(17) for the succeeding network section 20(01) is used.

In case that different data are processed by the respective processor units under control of a program, when the timings of inputting two items of data among processor units must be adjusted, sequencer 37 may apply a control signal for delay adjustment to delay circuit 60.

Formation of Total Colorplexed Video Signal FIG. 6

A video signal processing function that can be realized by using the video signal processing system as mentioned above is in block form illustrated in FIG. 6. In this instance, one composite video signal is separated into a luminance signal and a color signal by processor unit 401. The succeeding processor unit 402 matrixes the color signal luminance signal to produce a trio of signals R, G and B. The separation into the luminance signal and color signal may be realized through a data processing similar to a comb filter. The next processor unit 403 Y corrects those three primary color signals R, G and B. The correction may be realized in a manner that the processor unit detects a level of the video data, and varies a coefficient in the multiplier having been supplied the video data, in accordance with the detected level. The resultant R, G and B signals are reversely matrixed into a luminance signal and a color signal. The thus obtained luminance signal and color signal are encoded by the succeeding processor unit 405, so that those are outputted as a total colorplexed video signal.

Figure 7:
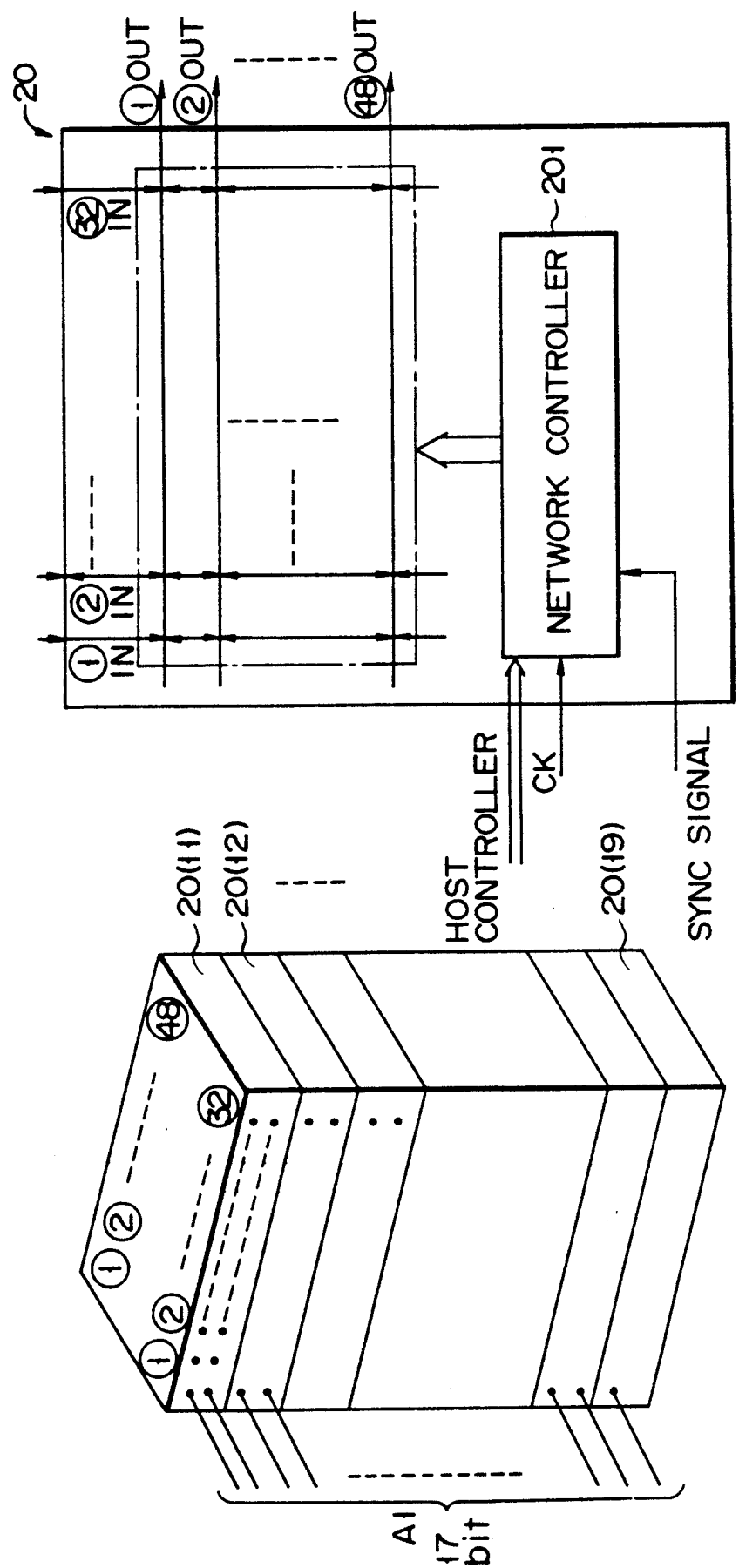
FIG. 7(a) shows a perspective view of the network section used in the the digital video signal processing system of FIG. 1(a)
FIG. 7b) is a diagram showing the inwards of the network section of FIG. 7(a)

Network Section FIG. 7

Details of network section 20 will be given with reference to FIG. 7.

As shown in FIG. 9(a) network section 20 is made up of six LSIs 20(01) to 20(19). Of 17 input lines allowing unit data of 17 bits to pass therethrough, 16 lines are grouped into 8 pairs of input lines. 8 pairs of input lines are coupled with 8 LSIs 20(11) to 20(18), respectively. The remaining one input line is coupled with the remaining one LSI 20(19), which is located at the bottom of the LSI stack in the figure. In the figure, the 17 input lines of input (1)IN are typically illustrated. The connection of the input lines to the LSIs is correspondingly applied to the output lines The reason why a group of 17 lines is dividedly coupled with the 9 LSIs is to prevent an intricate wiring to the LSIs. When the input and output lines are connected to the LSIs as shown in FIG. 7(a), the number of lines connected to each of the LSIs 20(11) to 20(19) is: $2 \times (32 + 48) = 160$. Each LSI has 160 terminals. As a vehicle for comparison, let us consider such a connection that a group of 17 input lines is connected to each of 32 inputs of one LSI, and likewise a group of 17 output lines, to each of 48 outputs of the LSI. In this case, the number of lines coupled with one LSI is: $17 \times (32 + 48) = 1360$. In other words, a single LSI must be provided with 1360 terminals. Practically, it is very difficult or almost impossible to couple such a large number of terminals with the single LSI.

The illustration of FIG. 7(b) shows the innards of one LSI of network section 20.

In order that the digital video signal processing system of FIG. 1 attain various types of video signal processings, it is necessary that connections in network section 20 must be variously and flexibly altered at a high speed. To this end, network section 20 is so designed that inputs (1)IN to (32)IN and outputs (1)OUT to (48)OUT are arranged in a matrix array, and switching elements are respectively placed at cross points of the input and output lines. Connection and disconnection of those input and output lines are realized by turning on and off those switching elements Network section 20 further contains network controller 201 which is integrated into the network section Controller 201 controls the on of the switching elements Controller 201 contains a data storage means such as a memory or register for storing control data supplied from host controller 22. Control data to specify types of connection pattern in the network may previously be stored in the storage means The storage means is triggered by a proper pulse, such as a sync pulse externally applied or a timing pulse from the sequencer, to output the control data and to provide a desired connection pattern or to change one connection pattern to another.

With the provision of network controller 201 in network section 20, the control data to provide connection patterns in network section 20 may be prestored therein When an operator desires to change a current video processing item to another, a current connection pattern may be readily and quickly changed to a connection pattern for the desired processing item merely by applying an external sync pulse or a timing pulse from the sequencer to controller 201. Since the connection pattern in network section 20 may be programmably altered, there is eliminated a manual work for physically changing the connection pattern.

Super Display FIG. 8

In FIG. 8, there is shown a connection of processor units 21(01) to 21(04) when the digital video processing system according to the present invention is used for making a superimpose (Super) display. Two different data A2 and B2 are inputted to processor unit 21(01). Data A2 is video data and data B2, character data. The format of the data is as shown in FIG. 2(b). In processor unit 21(01), arithmetic operation unit 33 has been set to be a comparator, and selector 34 has been set so as to select the output data of one of the first and second registers (1) and (2) in register section 44. When a level of the character data is high (period to insert a character signal into a video signal) arithmetic operation unit 33 produces flag "1". When it is lower than that of the video data (video signal period) the operation unit produces flag "0".

For flag "1", selector 34 selects the output data of the register (1), and for flag "0", it selects the output data of the register (2). The register (1) stores the gain control data necessary for a display period of the character signal. The register (2) stores the gain control data for a nondisplay period of the character signal.

The gain control data derived from selector 34 is supplied to the first inputs of processor units 21(02) and 21(03). The multiplier 32(02) in processor unit 21(02) has been set to serve as a multiplier. The video data has been applied to the second input of multiplier 32(02). Therefore, the video data derived from multiplier 32(02) by way of selector 34(02) is controlled in such a way that during the character display period, its gain is lowered, and during the period displaying no character signal, its level is kept in a predetermined level.

In processor unit 21(03), multiplier 32(03) is operated. One of the inputs of multiplier 32(03) receives gain control data from processor unit 21(01) by way of inverter 45. Though not shown, an inverter for inverting input data is connected to one of the paired inputs of the multipliers and arithmetic operations units, which are provided in the remaining processor units. Accordingly, the multiplier and arithmetic operation unit may selectively fetch an inverted signal and a noninverted signal. Character data is supplied to the other input of multiplier 32(03). Accordingly, in multiplier 32(03), during a display period of the character signal, the gain of the character data is emphasized, while during a nondisplay period of the character signal, the gain of the character data is suppressed (to zero).

Thus, the gain controlled video data is obtained from processor unit 21(03), and the gain controlled character data, from processor unit 21(03). The video data and character data thus obtained are applied to the first and second inputs of processor unit 21(04). In processor unit 21(04), arithmetic operation unit 33(04) serves as an adder. Accordingly, the video signal delivered from arithmetic operation unit 33(04) through selector 21(04), contains the character signal.

In case that a plurality of the processor units are coupled as shown in FIG. 8, it is very useful that either of the output signals of register section 44 be selected by selector 34 according to a state of a flag supplied from arithmetic operation unit 33, as in processor unit 21(01).

To be more specific, processor unit 21(01) is so arranged that before a flag generated is transferred to the next processor unit 21(02), it drives selector 34 to select one of the output data of the first and second registers (1) and (2), and the selected output data is transferred to the succeeding processor unit 21(02). Such an arrangement allows construction of the processor units 21(01) to 21(04) to be standardized. In other words, all the processor units may be constructed to have two inputs and one output. If a flag generated by processor unit 21(01) would be directly transferred to the succeeding processor units 21(02) and 21(03), a line for flag transfer is needed, making the system wiring intricated. Additionally, those succeeding processor units need check means to check if the flag is "0" or "1". The additional means increases the number of processing items, and makes the circuits of the processor units complicated and expensive.

In the above description, the digital video signal processing system is operated for forming a video signal for a Super display. If required, it may be operated for forming video signals for a mixing or dissolve (Dis) display.

To display an image of image data A2 on the left half of a screen and an image of image data B2 on the right half, processor unit 21(01) is operated in such a way that arithmetic operation unit 33 is turned off, selector 34 is under control of sequencer 37, and the output data of the registers (1) and (2) are switched from one to the other at a mid point of the horizontal period. For the Dis display, selector 34 is controlled by the sequencer so that time intervals to select the output data of the register (1) are gradually decreased for each field, while time intervals to select the output data of the register (2) are gradually increased Host I/O FIG. 9

Figure 9:
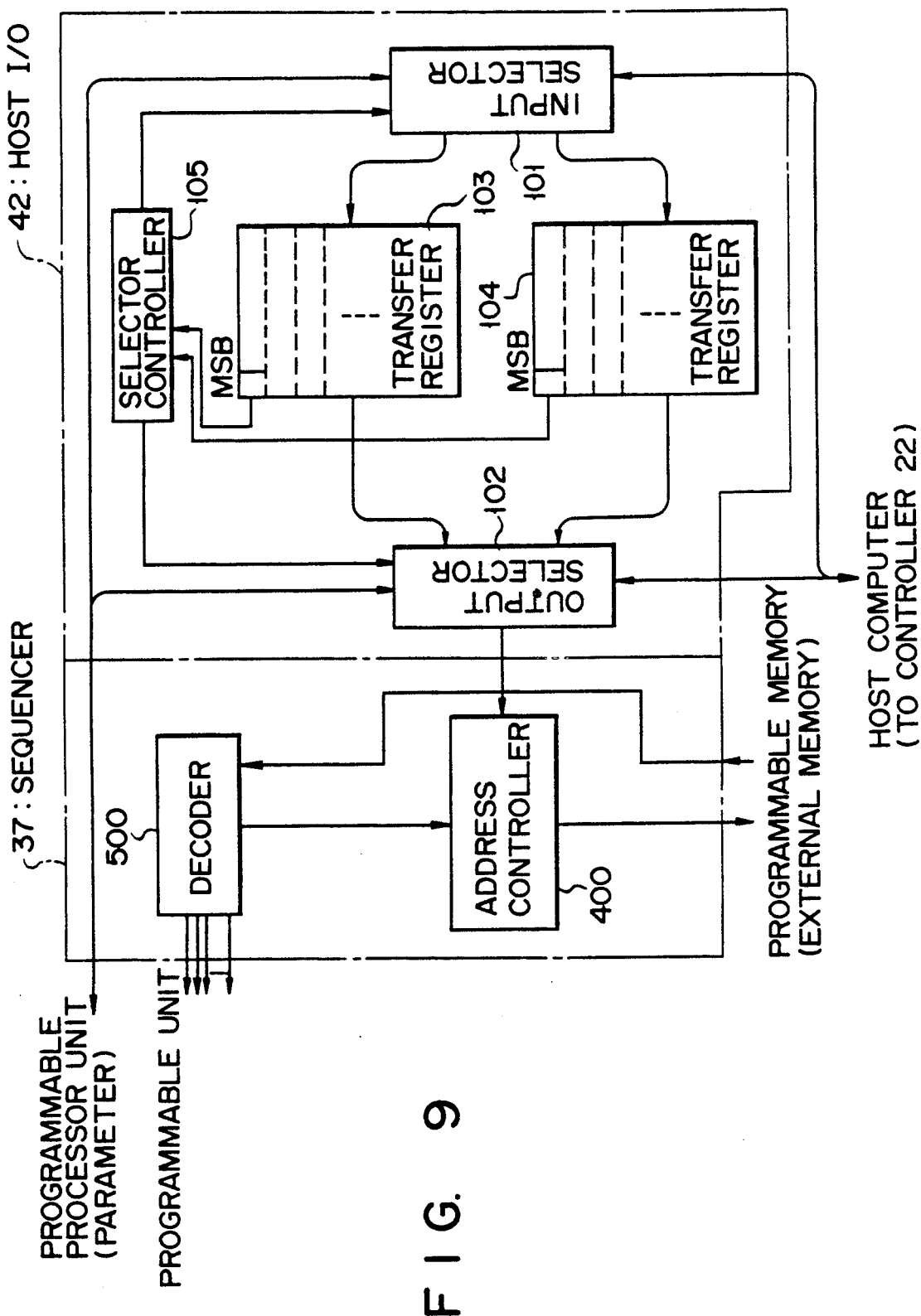
FIG. 9 is a block diagram showing an arrangement of a host interface used in the processor unit of FIG. 2.

FIG. 9 shows the details of host I/O 42 shown in FIG. 2.

As recalled, the digital video signal processing system according to the present invention may flexibly change its function in accordance with the signal processing purposes. As a matter of course, it may obtain the special effects such as Wipe, reduction and rotation. To realize such functions, it is necessary to switch video signal processing modes, or replace a program for the processor units by another and parameters for the video signal processings by other parameters. When a video signal processing mode is changed, particularly when parameters are replaced by new parameters, a long time is consumed, so that a reproduced image will tear when the signal processing progresses in real time.

To cope with the above problem, the host I/O of FIG. 9 uses at least two transfer registers. A program address and parameters to be used in the next processing mode are stored into one of the transfer registers under control of the host controller. With provision of the registers, in the programmable controller (processor unit), a current processing mode can be smoothly changed to a new processing mode.

In FIG. 9, reference numeral 101 designates an input selector, and 102 an output selector. Data from a host computer in host controller 22 is applied to input switching unit 101. Input selector 101 selectively transfers the received data to transfer register 103 or 104. The output data of transfer registers 103 and 104 are transferred to output selector 102 The output selector selects one of the output data of the transfer registers, and transfers the selected data to the arithmetic operation unit, multiplier, selectors, and the like (those components will be generally referred as a programmable section) in the processor unit, under control of sequencer 37. The output data signal of selector 102 is also applied to address controller 400 of sequencer 37. Address controller 400 for controlling addresses of an external memory is capable of updating addresses.

Transfer registers 103 and 104 each consists of a plurality of registers. The most significant bit of the data stored in a specific register of the plurality of registers is transferred to selector controller 105. The selector contains a flip-flop with set and reset terminals. The most significant bits derived from transfer registers 103 and 104 is coupled for transfer with the set and reset terminals of the flip-flop. Selector controller 105 controls the selecting operation of input and output selectors 101 and 102. Through the selecting operations of those selectors, when one of the transfer registers 103 and 104 is coupled with the host computer, the other is coupled with the programmable section or address controller 400.

It is assumed now that transfer register 103 is coupled with the host computer, and transfer register 104 is coupled with the programmable section including the arithmetic operation unit, multiplier, sync signal proceeding unit, address generator, and the like.

The programmable section executes necessary arithmetic operations (image processing) by using parameters stored in transfer register 103. The address controller 400 of sequencer 37 addresses the external memory (program memory) and reads out program data from the external memory, and transfers it to decoder 500. consequently, decoder 500 produces timing pulses to read out parameters and operation timing pulses for the arithmetic operation unit and the like When transfer register 103 is coupled with the programmable section as described above, new data is loaded into transfer register 104 by the host computer When the new data loading to the transfer register is completed, the host computer sets a flag of "1" indicative of a loading completion in the most significant bit of the specific register of transfer register 104. Then, a logical state of the flip-flop of selector controller 10 is switched. When the flip-flop is switched, if in sequencer 37, a command to permit a register selection has been executed (decoded), selector controller 10 controls selectors 101 and 102 to connect transfer register 104 to the programmable section, and to connect transfer register 103 to the host computer At this time, under control of sequencer 37, transfer register 104 issues to address controller 104 a command to set a start address of the program memory This command is for starting a program for the new processing mode because the new processing mode has been set up in place of the old processing mode.

In accordance with the command, address controller 400 specifies an address of the program memory. The program data read out from the program memory is transferred to the decoder 500 of sequencer 37. Decoder 500 decodes the program, and produces operation timing pulses and parameter fetching pulses to the programmable section and causes the programmable section to execute the processings. Decoder 500 also applies timing pulses to address controller 400 which in turn executes the address updating operation.

When transfer register 104 is coupled with the programmable section and transfer register 103, with the host computer, as described above, if the current processing mode must be changed again, the host computer loads the parameters necessary for a new processing into transfer register 103, and sets a flag in the most significant bit of the specific register Consequently, connection of the transfer registers is switched as in the previous case.

As seen from the foregoing description, with provision of host I/O 42, a current image processing mode can be smoothly changed to a new image processing mode, because the parameters and start address value, and the like necessary for the next processing have been stored in the register before the processing mode is changed It is evident that this feature successfully solves the problem of image tearing, that is encountered in the real time image processing. Transfer registers of more than two may be provided, if necessary.

Figure 10:
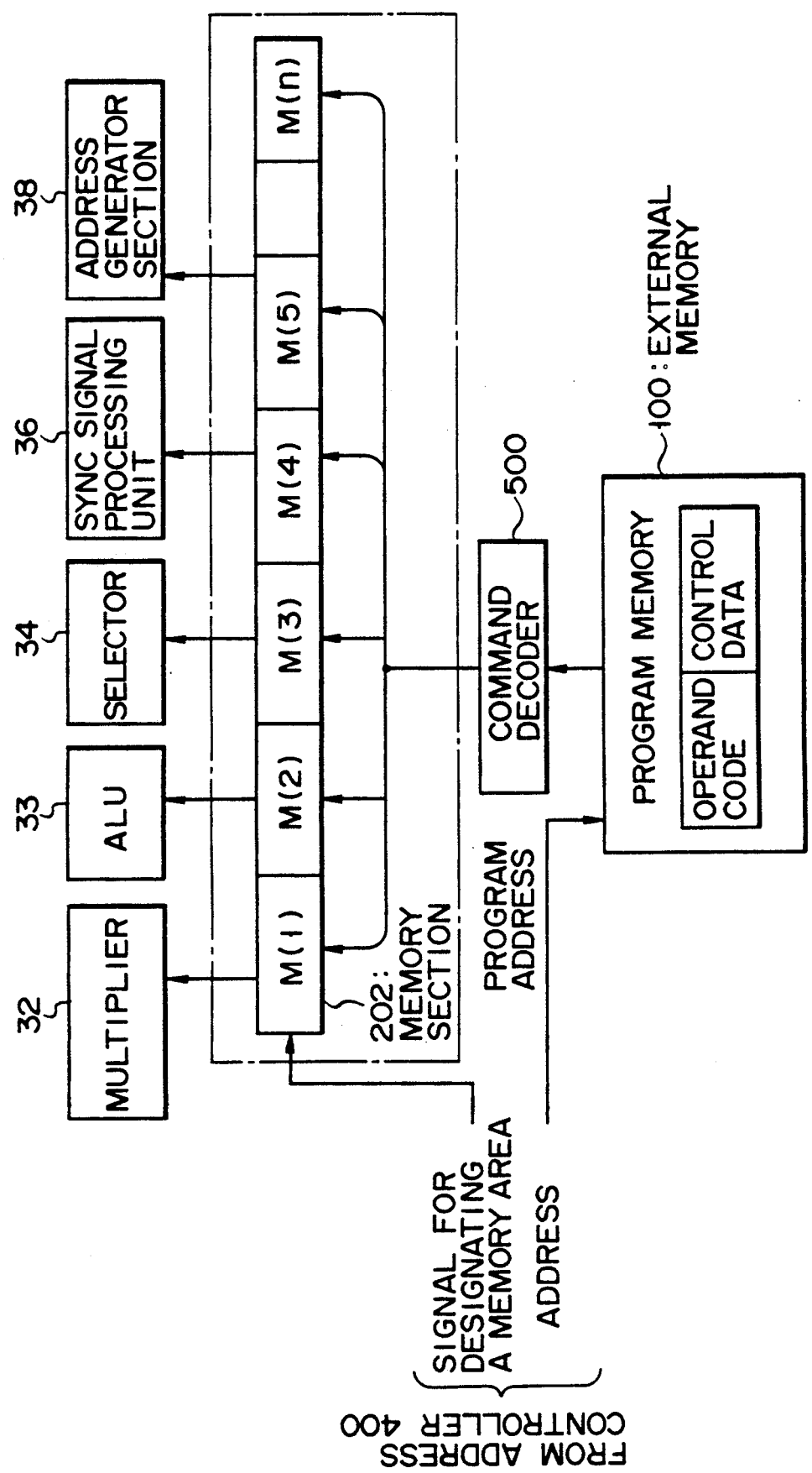
FIG. 10 is a block diagram showing an arrangement of a control memory used in the processor unit of FIG. 2.

Control Memory FIG. 10

Details of control memory 41 used in the digital video signal processing system of FIG. 1 will be given with reference to FIG. 10.

In the video signal processing system, sometimes a routine is repeatedly used. In such case, if its command data is read out from an external program memory at periods of a system clock signal, delays unavoidably occurs in the program reading operation, resulting in a disarray of data. The control memory 41 in FIG. 10 is used to prestore the commands for routine processings such as multiplication, addition, comparison, and the like.

In FIG. 10, external program memory 100 is coupled with command decoder 500 in an LSI. The command decoder decodes program data as read out of program memory 100, and transfers the decoded command to memory section 202. The memory section is made up of a plurality of memory areas M(1) to M(n). The memory areas M(1) to M(5) respectively correspond to multiplier 32, arithmetic operation unit 33, selector 34, sync signal processing unit 36, and address generator section 38. Those memory areas store respectively the command codes assigned to multiplier 32, arithmetic operation unit 33, selector 34, sync signal processing unit 36, and address generator section 38.

To write the command codes into memory areas M(1) to M(n), addresses for reading out programs are transferred to address controller 400 (illustrated in detail in FIG. 14). The program data are sequentially read out of program memory 100 and transferred to memory areas M(1) to M(n), through command decoder 500. The program data read out places the respective circuit blocks in processor unit 21(01) in proper operation modes.

Since the basic commands are prestored in control memory 41, the operation modes may be smoothly set up in the respective circuit blocks in the processor unit, respectively. For example, if sequencer 37 uses a sync signal per se as a trigger signal, and transfers control data to command decoder 500, the command codes are read out from the specified memory areas and simultaneously applied to the related circuit blocks. Thus, a short time is taken for actually loading the command codes to be stored in control memory 41, and in this case, there is no need for an increased bit length of the control data.

Address Generator Section FIGS. 11A, 11B, 12, and 13

A detailed circuit arrangement of address generator section 38 used in the system of FIG. 1 will be described with reference to FIGS. 11A and 11B.

This address generator section 38 is designed so as to flexibly generate various types of addresses, and to have various functions.

Geometrical conversion processings such as the enlargement and reduction of image size, and rotation of an image may be enumerated as major items of the video signal processings. The geometrical conversion processing provides special effects To obtain special effects, some operation must be applied to addresses to access an image memory. When an address of an original image signal is converted for the special effect, it is very important that an image signal outputted responsive to a new address is displayed while being placed within a frame or a desired area on the screen of the display. When a new address for the special effect is obtained by operating an address of the original image signal, the new address frequently contains a value of decimal fraction. Actually, however, the image memory does not have such an address (a false address) as expressed by the decimal fraction. In this case, it is necessary to search an address closes to such a value. It is necessary to produce the image data corresponding to the false address by using the closest address.

Figure 11A:
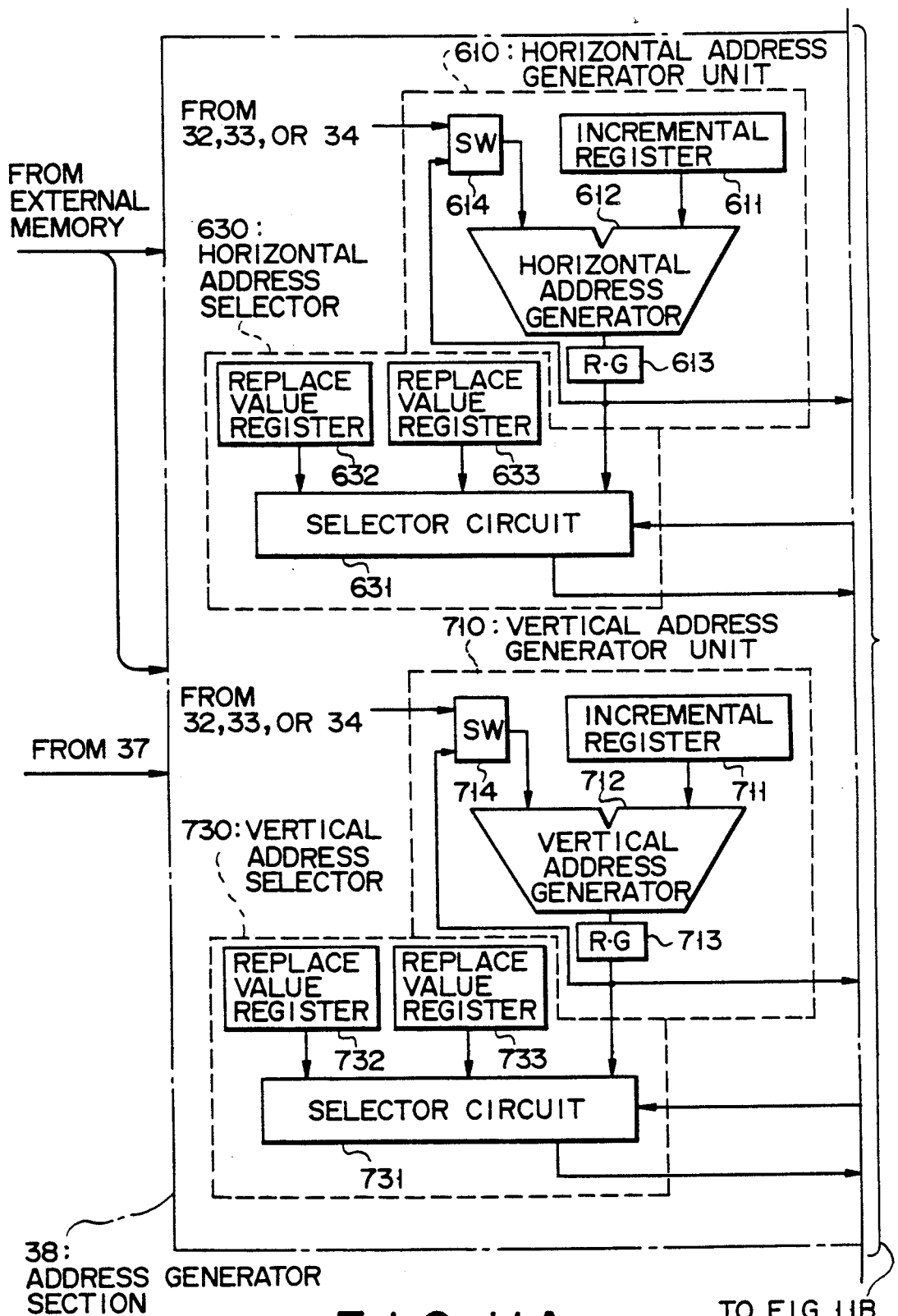
FIGS. 11A and 11B show a block diagram showing an arrangement of an address generator section used in the processor unit of FIG. 2.
Figure 11B:
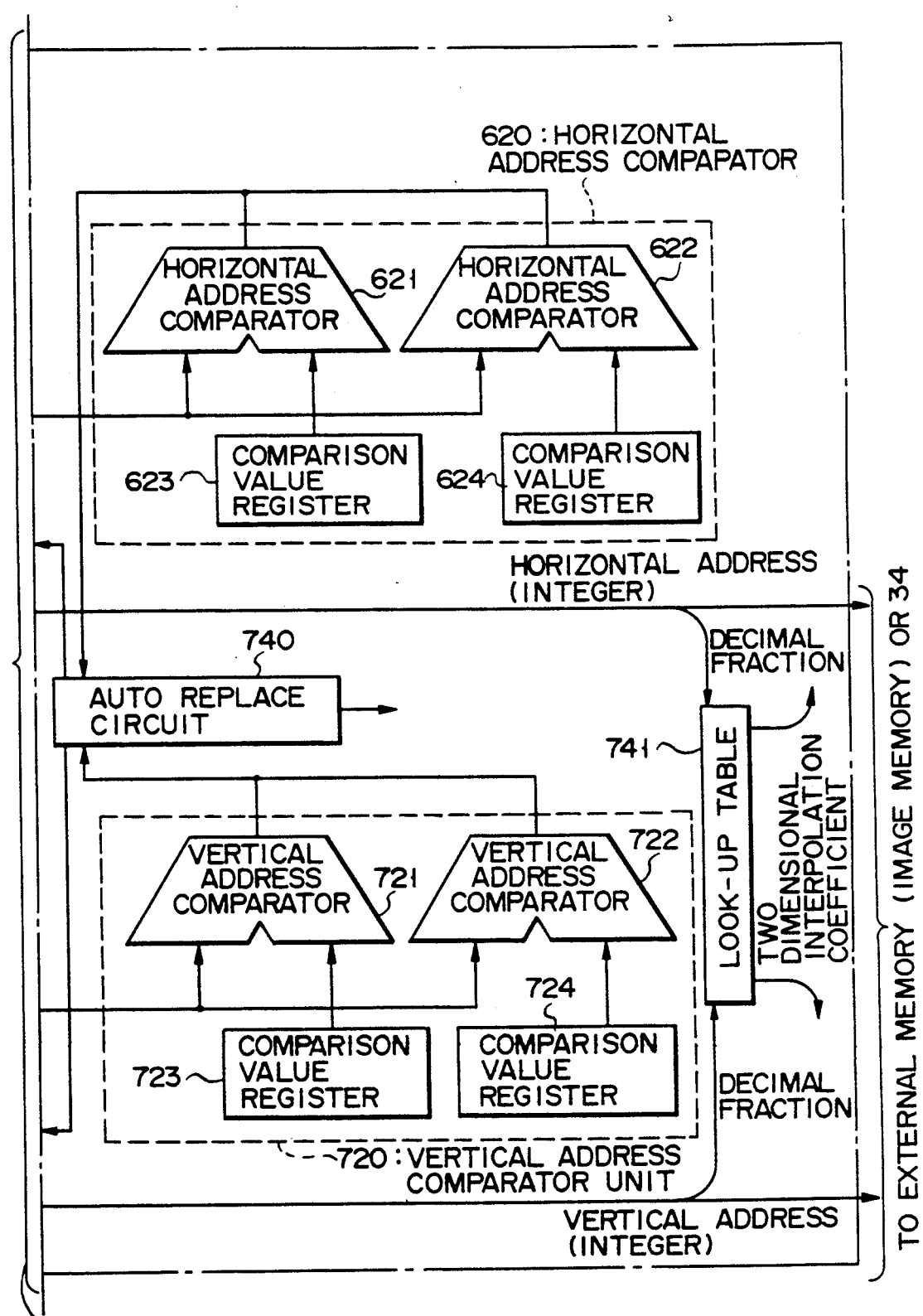

Address generator section 38 shown in FIGS. 11A and 11B has two functions, one to decide an area of a new address, and the other to generate interpolating coefficients used for a new address including a value of a decimal fraction.

Horizontal address generator unit 610, horizontal address selector 630, and horizontal address comparator unit 620 make up a circuit for obtaining a horizontal address. Horizontal address generator unit 610 includes incremental register 611, horizontal address generator 612, register 613, and switch 614. The output of incremental register 611 is coupled with a first input of horizontal address generator 611. An address for the initial value of a video signal is applied through switch 614 to a second input of horizontal address generator 612. In an address operation mode, the initial value address may be obtained from selector 34, multiplier 32, or arithmetic operation unit 33 (see FIG. 1). An address read out of the external data memory may be used for the initial value. Address generator 612 adds together two input data, and outputs a horizontal updating address, and transfers it to the selector circuit 631 in horizontal address selector 630. The horizontal updating address is supplied to the first inputs of the horizontal comparators 621 and 622 in horizontal address comparator 621.

The second inputs of comparators 612 and 622 are coupled for reception with the output data of comparison value registers 623 and 624. The results of the comparisons by comparators 621 and 622 indicate if the horizontal updating address is within an area set by registers 623 and 624. The result signal is supplied to auto replace circuit 740.

When the result signal indicates that the horizontal updating address is within the set area, auto replace circuit 740 causes selector circuit 631 to select the horizontal updating address derived from horizontal address generator 612, and outputs it as a new horizontal address at the output. When the result signal (flag) indicates that the horizontal updating address is outside the area, auto replace circuit 740 causes selector circuit 631 to select the output address of replaced value register 632. The address outputted from register 632 is used as an address specifying a memory location storing a single color, for example A circuitry for obtaining a vertical address is likewise provided Such a circuitry is made up of vertical address generator unit 710, vertical address selector 730, and vertical address comparator unit 720. Vertical address generator 712 includes incremental register 711, vertical address generator 712, register 713, and switch 14. The output of incremental register 711 is coupled with a first input of vertical address generator 712, while a second input of the vertical address generator receives an address for a video signal through switch 14. In an address operation mode, this address is supplied as an initial value address from selector 34, multiplier 32 or arithmetic oration unit 33 (see FIG. 1). This initial value address may be supplied from the external data memory. Address generator 712 adds together two input data, to form a new vertical updating address and outputs it to selector circuit 731 in vertical address selector 730 The vertical address is applied to the first inputs of vertical address comparators 721 and 722 in vertical address comparator unit 720.

The second inputs of vertical address comparators 721 and 722 are coupled for reception with the outputs of comparison value registers 723 and 724, respectively The comparison results from vertical address comparators 721 and 722 check if the new vertical updating address is within an area set by comparison value registers 723 and 724. The result signal is applied to auto replace circuit 740.

When the result signal indicates that the vertical updating address is within the set area, auto replace circuit 740 causes selector circuit 731 to select the vertical updating address derived from vertical address generator 712, and outputs it as a new vertical address at the output. When the result signal (flag) indicates that the vertical updating address is outside the area, auto replace circuit 740 causes selector circuit 731 to select the output address of replaced value register 732. The address outputted from register 732 is used as an address specifying a memory location storing a single color, for example.

The replaced value register 633 in horizontal address selector 630 and the replace valve register 733 in vertical address selector 730 are used for prestoring replaced data, for example, when a replaced value must be altered. The data to be stored in replaced value registers 632, 633, 732, and 733, and comparison value registers 623, 624, 723 and 724 are obtained from the external data memory, for example, under control of sequencer 37. The loading of such data to those registers is performed, for example, when the system is initialized or during a video sync signal period.

Figure 12:
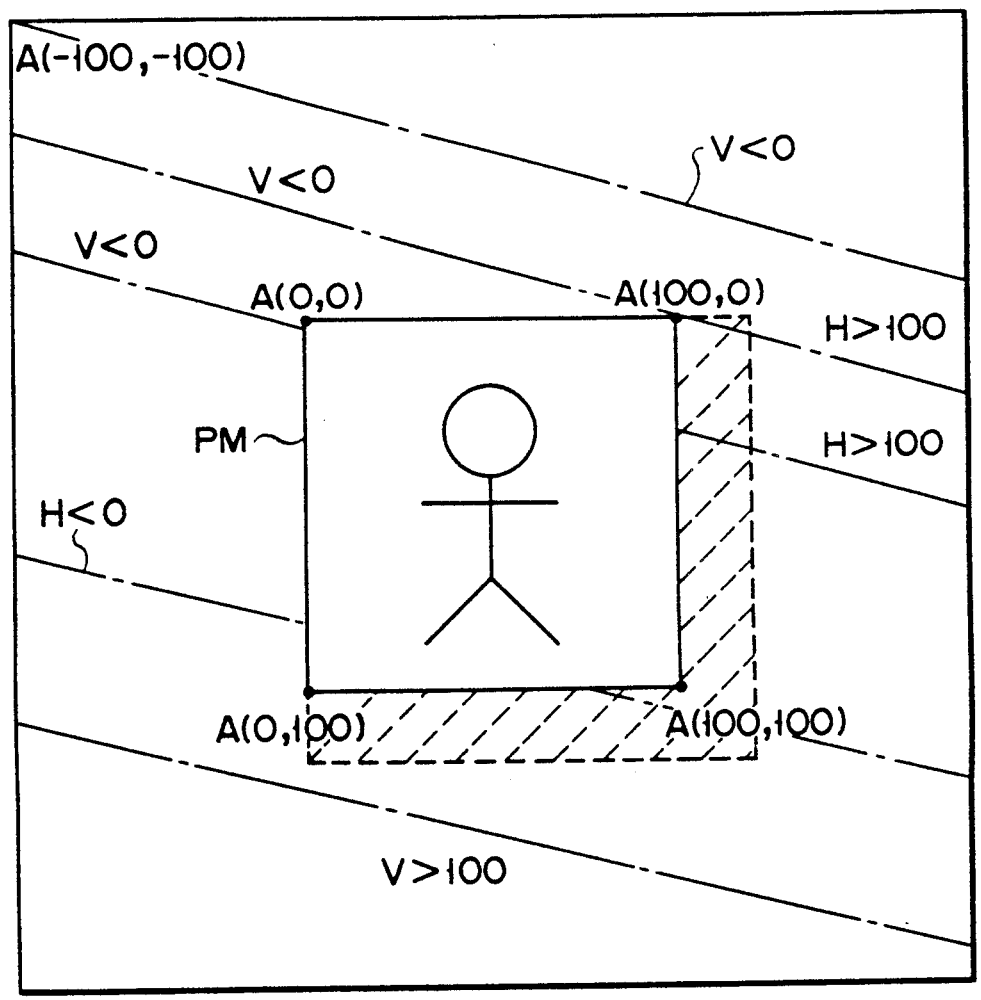
FIGS. 12(a), 12(b) and 12(c) are views showing image areas useful in explaining the operation of the address generator section of FIG. 11 when an image size shrinking is realized.

FIG. 12 shows an addressed area when an image reduction processing is performed by using addresses generated by address generator section 38.

It is assumed now that image data as shown in FIG. 12(a) is stored in an image memory, and that the image data is read out, and an image of the image data is displayed while being reduced in size.

It is assumed now that an area of an image memory (PM) shown in FIG. 12(a) is defined by addresses A(0, 0), A(100, 0), A(100, 100) and A(0, 100) that a fixed incremental value, e.g., 2, is set in incremental registers 611 and 711 shown in FIG. 11, and that an initial address A(−100, −100) is applied to horizontal and vertical address generators 612 and 712.

A first address A(−100, −100) obtained from horizontal address generator unit 610 is outside the area of the image memory (PM), and a false address. Therefore, the data cannot be read out from the image memory (PM) by using the false address. When an address outputted from horizontal address generator 612 is updated at the period of a clock signal, and an address from vertical address generator 712 is updated in synchronism with a horizontal sync signal, the data outputted from the image memory provides an image reduced ½ as shown in FIG. 12(b).

In the above case, the horizontal address is updated every clock period, and the vertical address is updated in synchronism with the horizontal sync signal. There is another case that the horizontal address and vertical address are updated simultaneously. In this case, the output data of the image memory (PM) produces an image halved in size and rotated in orientation. In the above cases, in order to form a reduced image, a negative address A(−100, −100) is applied as an initial value to horizontal and vertical address generators 612 and 712. If the initial value applied to those address generators is a positive address, the resultant data is for enlarging an image.

As seen from the foregoing, reduction, enlargement and rotation of an image are realized by setting an initial address and incremental values to horizontal and vertical address generator units 610 and 710.

Figure 12B:
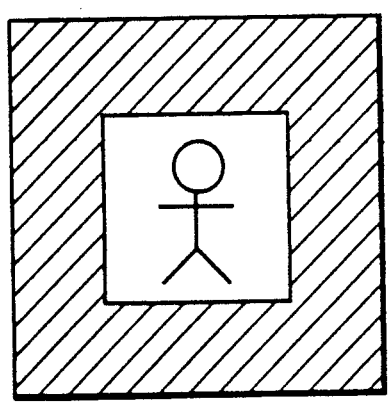
Figure 12C:
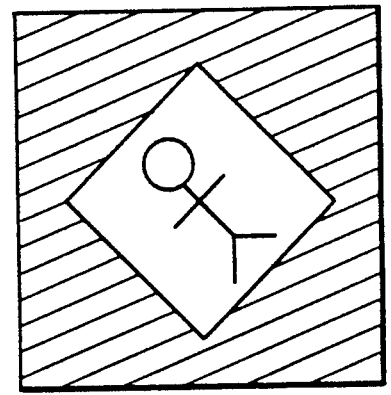

The shaded areas in FIGS. 12(b) and 12(c) are formed by the data outside the area of the image memory (PM). Horizontal and vertical address comparator units 620 and 720 are provided for judging whether or not the horizontal and vertical addresses generated by address generators 610 and 710 are those of the image memory (PM) (FIG. 12(a)). Horizontal address comparator 621 judges whether or not a horizontal address H is negative. Another horizontal address comparator 622 judges if the horizontal address H is larger than 100. Vertical address comparator 721 judges whether or not a vertical address V is negative. Another vertical address comparator 722 judges if the vertical address V is larger than 100. Thus, horizontal and vertical address generator units 620 and 720 judge the following conditions shown in FIG. 12(a):

H<0, H>100, V<0, and V>100.

The result of the judgement is supplied to auto replace controller 740. An address generated when any of the above conditions holds specifies the data outside the area of the image memory (PM). Therefore, auto replace controller 740 is caused to produce a specific address This address specifies an additional area of the image memory (PM) (enclosed by a dotted line in FIG. 12), for example. The memory location of this specific address stores color data of a predetermined color, for example Thus, the data for the shaded area in FIGS. 12(b) and 12(c) is the color data of a predetermined color.

When the horizontal and vertical addresses derived from address generator section 38, and selector circuits 631 and 731 are expressed by integers, those are directly applied to the external image memory. When the values of those addresses include figures of the decimal fraction, those addresses are of the decimal fraction supplied to look-up table 741. The look-up table is addressed by input data, and produces a two-dimensional interpolation coefficient on the basis of the addresses of the decimal fraction.

Figure 13:
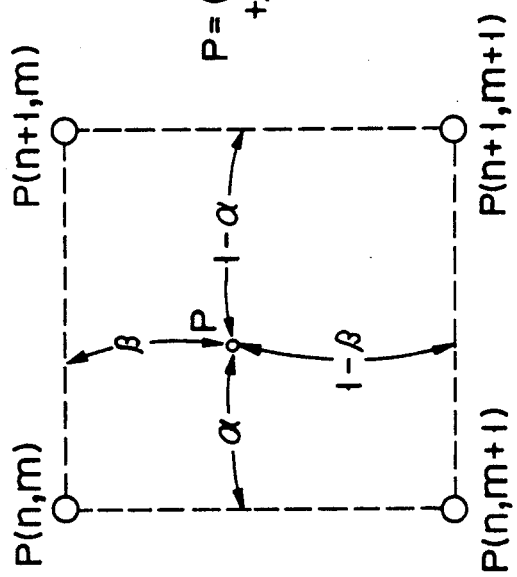
FIG. 13 is a view showing a relationship of a pixel (picture element) position vs interpolation addresses, which is also useful in explaining the operation of the address generator section of FIG. 11.

When the horizontal and vertical address values contain figures of the decimal fraction, those are false addresses which fail to specify any actual picture element. In this case, it is necessary to search an actual address closest to the false address by using the figures of the decimal fraction It is assumed that false address (n, α, m, β) is generated as shown in FIG. 13. The false address indicates a phantom memory location in the image memory, which cannot be specified by any of the addresses assigned to the image memory. To cope with this, it is necessary to obtain interpolation coefficients by using the values of the decimal fraction of the false address (n, α, m, β). For example, when the figures of the decimal fraction are "α" and "β" for the unit address interval, the following four coefficients $(1-\alpha)(1-\beta)$, $(1-\beta)\alpha$, $\beta(1-\alpha)$, and $\alpha\beta$. The image data P corresponding to the false address may be expressed by $$P = (1 - \beta)(1 - \alpha)P(n, m) + (1 - \beta)\alpha P(n + 1, m) + \beta(1 - \alpha)P(n, m + 1) + \beta(1 - \alpha)P(n, m + 1) + \beta\alpha P(n + 1, m + 1)$$

Therefore, if the above four coefficients are prestored in look-up table 741, proper two dimensional interpolation coefficients may readily be selected. Further, if the two dimensional interpolation coefficients and the horizontal and vertical addresses are applied to the succeeding processor unit (not shown), the image data as specified by the actual address as the interpolated addresses can be obtained. In other words, the image data P as specified by the false address may be obtained by using the existing image data P(n, m), P(n+1, n) P(n+1, m+1), and P(n, m+1).

Sequencer FIGS. 14 through 19

Details of sequencer 37 used in the video signal processing system shown in FIG. 1 will be given.

Sequencer 37 reads out program data from the external program memory or program table 10(01), and decodes the read out program data, and controls the respective circuits in the LSI shown FIG. 1 by the decoded signals.

This sequencer is so designed that a memory area of the external program memory may effectively be used.

The sequencer 37 is designed so as to stop a latch clock applied to latch 503 for latching a command from program memory 100. To be more specific, in a condition that the same command is repeatedly used, condition code X1 or X2 is supplied to decoder 504. Upon receipt of this, decoder 504 controls clock control circuit 505 to stop supply of a clock signal to latch 503 storing a command (program data). At this time, the address updating for program memory 100 is also stopped. When a situation is set up in which supply of condition code X1 or X2 to the decoder stopped, a clock signal derived from clock controller 505 is supplied to latch 503 again, to allow the next command to be latched therein.

Thus, when the same command is repeatedly used, the command is latched by temporarily stopping the reading operation of the program data from program memory 100, whereby program memory 100 is more efficiently used.

In the digital video signal processing system, during the course of executing a data processing in accordance with a program sequentially read out of program memory 100 in the order of addresses, some conditions require a jump in accessing the program memory. For example, during the course of incrementing an address in the arithmetic operation unit of the address generator section, when the address reaches a predetermined value, sometimes the incrementing operation for address value thus far performed must be switched to the decrementing operation To effect this, a program is required that switches the operation mode of the arithmetic operation unit to a subtraction mode.

To this end, particularly when a program must be replaced by another program at a high speed, sequencer 37 checks condition code X1 or X2 by decoder 504, and controls program table 10(1) and selector circuit 501 on the basis of the check result so as to use a program prestored in program table 10(1).

Further, sequencer 37 is so designed that when a jump addressing is needed, it controls jump address table 401, and selectors 402 and 403 so that a next jump address is instantaneously applied to external memory 100. The jump address is prestored in jump address table 401.

Remember here that when one command is repeatedly used in processor unit 21(01), sequencer 37 is capable of stopping the supply of a clock signal to the latch for latching a command code. When a command code must be selected at a high speed, it is capable of automatically accessing program table 10(1), and using the prestored program Additionally, it can automatically generate a jump address in accordance with a plurality of condition codes. Program table 10(1) is used as a part of external program memory 100, and with the aid of this table, sequencer 37 enables the successive supply of command codes.

FIG. 14 shows the details of sequencer 37.

Addresses to external program memory 100 are generated by address controller 400. The address controller 400 includes jump address table 401 whose output is connected to selector 402. When condition X1 holds, selector 402 selects jump address Ad1 and outputs it. When condition X2 holds, it selects and outputs jump address Ad2. The address Ad3 selected by selector 402 is connected to selector 403. Selector 403 selects any of address Ad6 on an address connecting to external memory 100, address Ad6 from program counter 405 and the address Ad3, and supplies it to latch 404. Address Ad5 derived from selector 403 is supplied to latch 404. Address Ad6 from latch 404 is supplied to external program memory 100 and also to program counter 405. latch 404 is driven by a clock signal from decoder unit 500.

Decoder 500 receives program data from external memory 100 and program data from program table 10(1). Selector 501 selects either of program data Da1 and Da2, and outputs it. The program data from selector 501 is supplied to selector 502. Selector 502 selects either of data Da3 from the selector 501 and data Da4 from program memory 100, and outputs the selected one.

Output data Da5 of selector 502 is latched in latch 503. Output data Da6 of latch 503 is decoded by decoder 504.

Decoder 504 decodes program data, and produces a control signal based on the decoded data for transmission to the related circuit blocks Further, it judges condition code X1 and X2, and controls address controller 400, program table 10(1), selectors, and the like.

FIG. 15 shows a sequence of program data reading operation by sequencer 37 when it reads out program data from the program memory in the address of consecutive addresses in an ordinary prefetch mode.

Before a command stored at "a" address is executed, for example, three periods of a clock signal exist. A first period of the clock signal is for fetching the command at "a" address; a second period, for decoding the fetched command; and a third period, for executing the decoded command. When the "a" address command is being decoded, a command at "b" address is fetched The reason for this is that the address of the "a" address command is incremented by one in program counter 405, and it is latched as an address of the "b" address command in latch 40. Accordingly, sequences of fetch, decode and execution operations for the commands at the "a", "b" and "c" addresses are staggered by one period with respect to one another, and each start at the leading edge of the clock pulse signal. The sequence of the "b" address command lags by one period behind that of the "a" address command, and the sequence of the "c" address command lags by one period behind that of the "b" address command The address data Ad4 and Ad5 as the input and output data to and from selector 403, and the output address data Ad6 of latch 404 change at the trailing edge of the clock pulse signal.

When sequencer 37 operates in accordance with the above sequences, selector 403 selects address data Ad4 Selector 503 selects the program data Da4 from program memory 100.

Decoder 504 determines the contents of Control codes (1) to (5), Ad and Aa in accordance with condition codes X1 and X2, and the program data from program memory 100.

The commands to determine operation modes of sequencer 37 are given below.

DO: Present address loop (repeat the same command)
CONT: Next address branch (go a command at the next address)
JMP: Branch command (go to a command at the jump address)

When using these commands, three commands are combined like DO/CONT/JMP or DO/JMP/JMP. Condition codes X1 and X2 determine which of the commands is executed.

When DO/CONT/JMP is set in decoder 504, the commands to be executed are as follows:

(1) DO is executed when neither condition X1 nor X2 holds.
(2) CONT is executed when condition X1 holds.
(3) JMP is executed when condition X2 holds.
(4) CONT is executed when both conditions X1 and X2 hold.

The operation modes of sequencer 37 by commands DO, JMP and CONT will be described.

DO command

Figure 16:
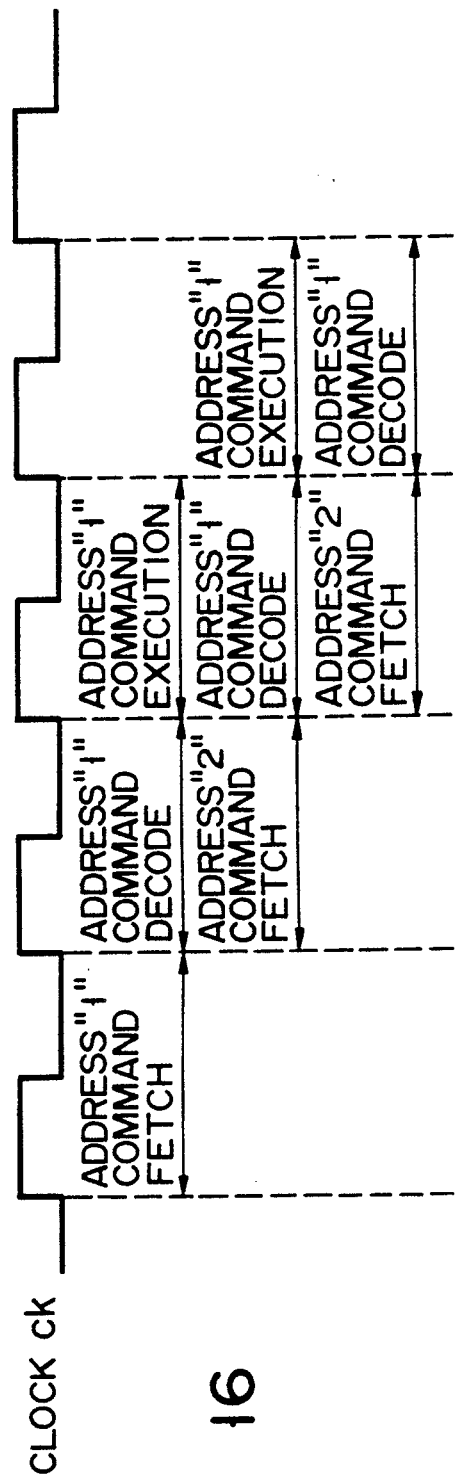

FIG. 16 shows a sequence of operations of sequencer 37 when a command (e.g., a command at the first address) from program memory 100 is the DO command When a DO command is latched in latch 503 and decoded by decoder 504, output address Ad6 of latch 404 is used for fetching a command at the second command due to a prefetch function. When the DO command is used, however, decoder 504 produces control code (3) and inhibits clock controller 505 from outputting a clock signal by the control code. Accordingly, the command at the 1st address remains latched in latch 503, and the command at the 2nd address is continuously retained in latch 404.

As a result, a control status set up in accordance with the 1st address command latched by latch 503 is maintained. This control status is permitted to change to another control status when condition code X1 or S2 is inputted. When condition code X1 is inputted, the CONT command is selected. When condition code X2 is selected, the JMP command is selected.

The DO command is effective when the same processing is repeatedly applied to all the pixel data (video data) and color data in a successive manner. One command suffices. When a single video signal is multiplied by a fixed coefficient to control a gain of the video signal, it is convenient to use the DO command. When a horizontal sync signal arrives, it is combined with the JMP command to jump to a jump address for replacing the multiplier.

CONT command

This command may form a sequence of operation like that described referring to FIG. 15. As seen from FIG. 1, addresses "a", "b", "c" and "d" are consecutively accessed.

JMP command

This command is useful in preventing the consecutive supply of commands from being stopped in a jump mode. This is done by using commands prestored in program table 10(1).

Figure 17:
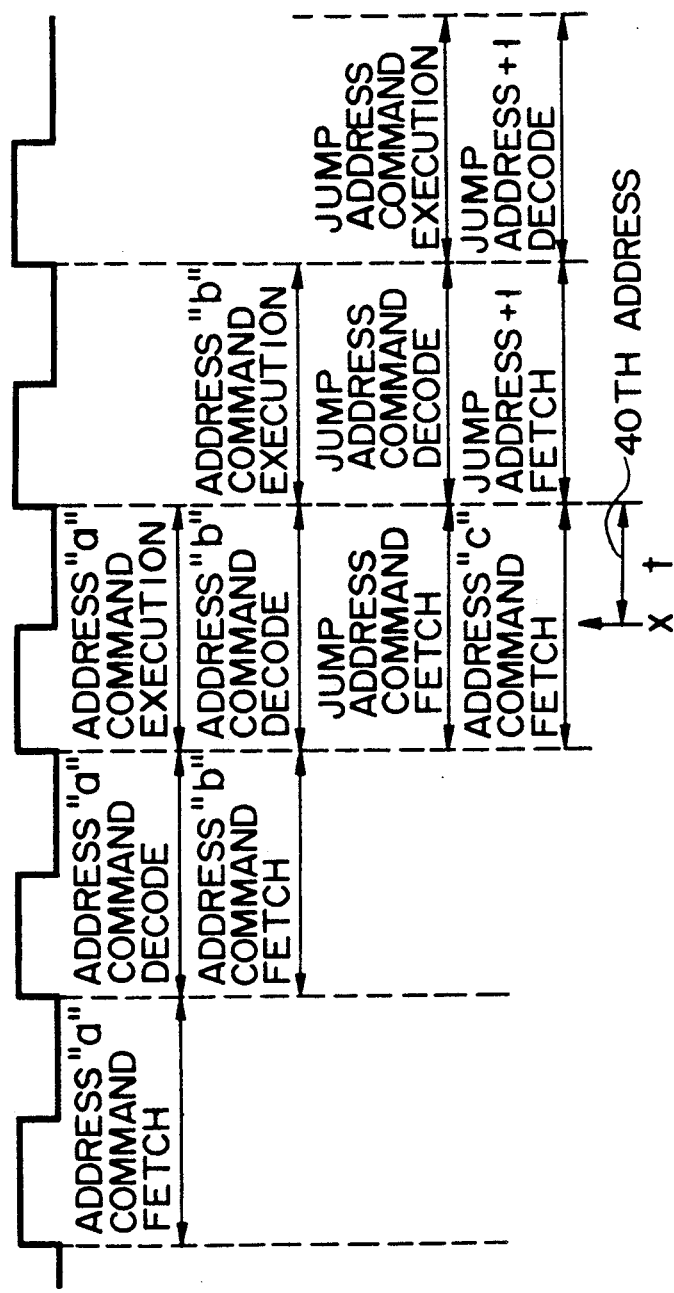

FIG. 17 shows a sequence of a jump operation by sequencer 37. Addresses "a", "b" and "c" are consecutive. When a command at address "b", for example, is being decoded, condition code X1 or X2 is applied to decoder 504, and a jump command is conditioned. While the command at address "b" is being decoded, control codes (4), (5) and Ad control selectors 501 and 502, and program table 10(1), so that command data from program table 10(1) is latched in latch 503. In address controller 400, the address (of "b") is automatically updated to generate an address "c". Before a command at address "c" is read out, a prefetch address is replaced by a jump address by the command data outputted from jump address table 401. This is because a command at a jump address read out program table 10(1) causes control codes Aa, (1) and (2) to control jump address table 401, selectors 402 and 403, and hence the jump address is latched in latch 404.

Therefore, when the address "b" command is being decoded, the command data at the jump address is fetched from program table 10(1), and when the address "b" command is being decoded, the command data is decoded After the address "b" command is executed, the command at the jump address is executed When the first command from program table 10(1) is being decoded, the next jump address is automatically generated, and the next address has been fetched.

Program table 10(1) stores a jump address (e.g., a command at the 40th address) and the control code for jump address table 401 At this time, jump address table 401 outputs the 41st address Consequently, a program routine at the address to which control jumps is available.

As seen, the command data at the jumped address and the jump address may be quickly generated by using program table 10(1). Let us consider now that program table 10(1) is not used. If a jump condition holds during the course (point x) of decoding the command at address "b", an access time for program memory 100 is only period "t". Period "t" is insufficient for the access time as at least one period of a clock signal is required. The insufficient access time possibly causes an error in the command data.

In sequencer 37, however, immediately after a jump condition holds, the first command at the jump address and the succeeding address are generated. Therefore, consecutive data processings may be smoothly realized.

Figure 18:
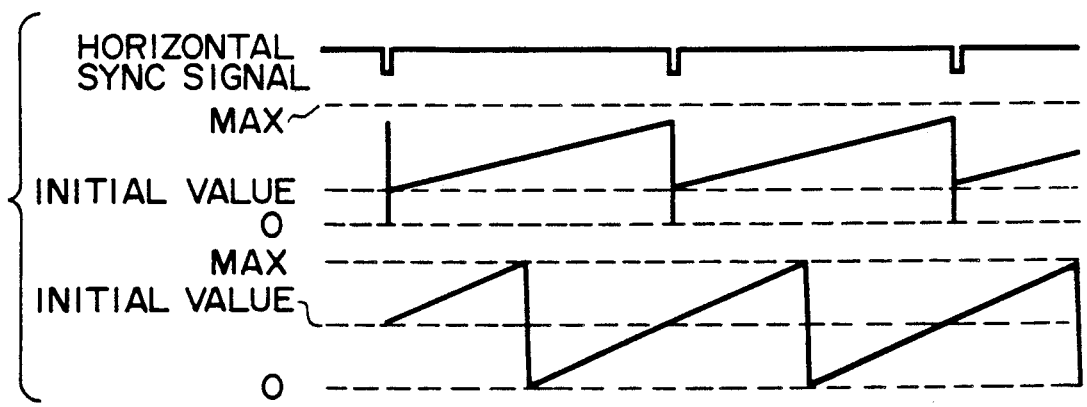
FIG. 18 shows a timing chart for explaining an address generation by the address generator section under control by the sequencer of FIG. 14.

Program table 10(1) stores the command data corresponding to the jump address for the respective circuit blocks in the processor units, in addition to the command data to generate next address of the jump address. When a sync signal arrives, for example, it is necessary to replace the data in the address register of address generator 38 during a sync signal period. In this case, when a sync signal arrives (or condition X1 holds), it may cause program table 10(1) to produce the first command for data replacement, and then the external program memory to output the next command for the data replacement. While the commands DO, CONT, and JMP have individually been described, these commands are combined when the whole system is operated. The combined command DO/CONT/JMP is used for executing a processing as shown in FIG. 18. FIG. 18 shows two types of triangle waves, a triangle wave A91 synchronized at peak points with a horizontal sync signal, and a triangle wave A92 whose peak point is shifted by the half period from the horizontal sync signal. To change an address like triangle wave A91, when a horizontal sync signal arrives, the program memory is accessed by a jump command and an initial value in the address generator section is replaced by another value. In response to a DO command, the address generator section executes the address increment processing to progressively increment an address To generate an address like triangle wave A92, when a horizontal sync signal arrives, the program memory is accessed by a jump command and an initial value in the address generator section is replaced by another value In response to a DO command, the address generator section executes the address increment processing to progressively increment an address. When the incrementing address reaches a maximum value the address is set to "0" by a CONT command, and then is progressively incremented.

When command DO/JMP/JMP is set in decoder 504, the relationships of condition codes X1 and X2 vs. individual commands are given below:
(1) DO is executed when neither condition codes X1 or X2 holds.
(2) JMP is executed when condition code X1 holds.
(3) JMP is executed when condition code X2 holds.
(4) JMP is executed when condition codes X1 and X2 are both executed.

Different addresses are stored in jump address table 401 so that the jump destination of item (2) above is different from that of item (3). In the case of item (4), jump is made preferentially to either of the two addresses to which control jumps.

It is assumed now that a command at address "a" derived from external program memory 100 is DO/JMP/JMP and the first jump address is the 40th address and the second jump address, the 50th address. In this case, jump address table 401 stores the 41st address and 51st address for addresses Ad1 and Ad2 Program table 10(1) store the commands at the 40th and 50th addresses.

When the DO command (present address loop) is being executed, if condition code X1 holds (for example a sync signal arrives), jump is made to the 40th address, and if condition code X2 (flag from the processor unit) is inputted, jump is made to the 50th address.

The above branch program may provide the addresses incrementing as indicated by the triangle waves shown in FIGS. 18(a) and 18(b).

Figure 19:
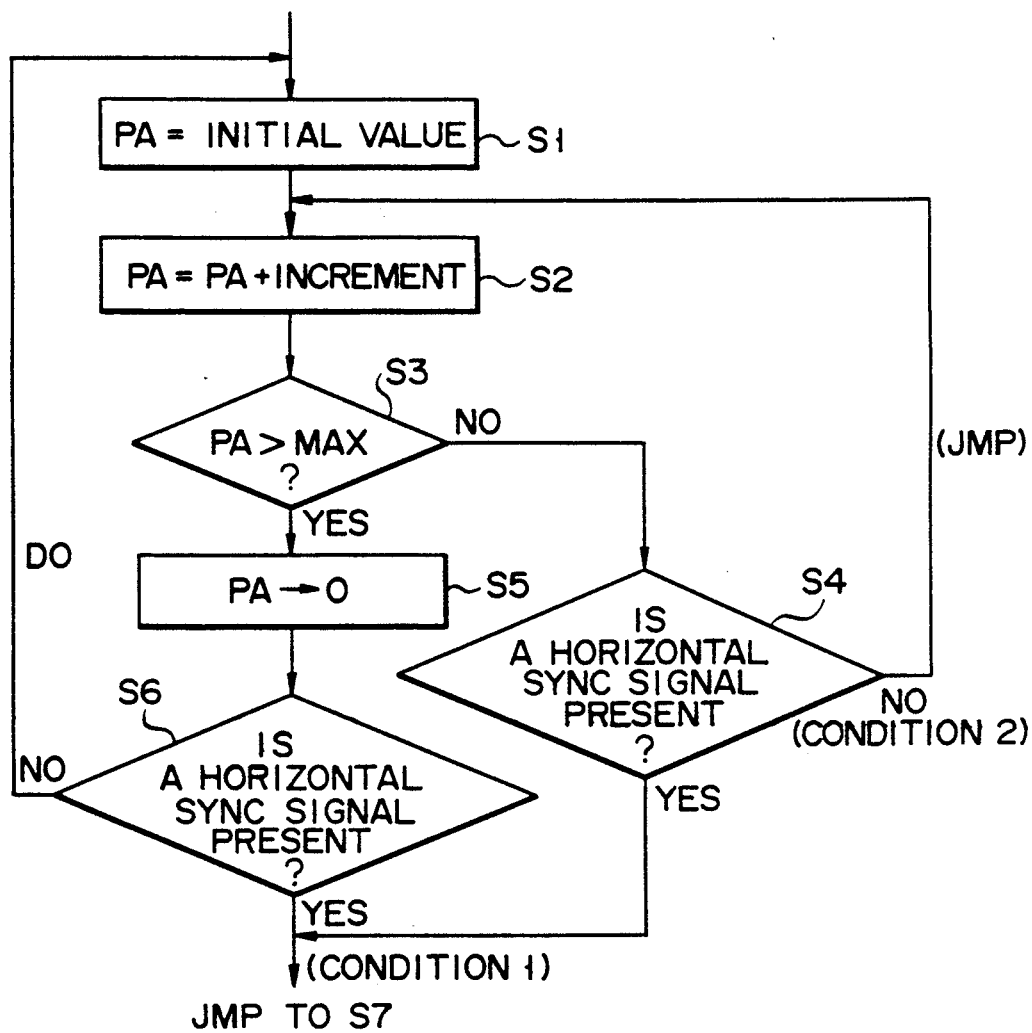
FIG. 19 shows a flowchart for explaining a control flow by the sequencer of FIG. 14 when the address generator section generates an address shown in FIG. 18.

To obtain a video address changing like the triangle wave shown in FIG. 18(a), a control flow as shown in FIG. 19 is used.

An initial address (PA) is loaded into the register of the address generator section (step S1). An increment (pa) is added to the initial address (PA) (step S2). Control checks if the addition result PA reaches a maximum value MAX by using the comparator (step S3). When the PA is below the MAX value, control checks if a horizontal sync signal arrives (step S4). If the PA reaches the MAX value (step S3), control in step S5 sets PA=0, and checks if a horizontal sync signal arrives (step S6). If it does not yet arrive (step S6), control returns to step S1. If it arrives, a JMP command is generated due to condition code X1, and control jumps to step S7. Step S7 is to replace the data such as the initial address during the horizontal sync period. The final step of the routine including step S7 executes a command to return control to step S1, for example. Also, when arrival of the horizontal sync signal is confirmed in step S4, control jumps to step S7. Conversely, when arrival of the sync signal is not confirmed, condition code X2 holds and a JMP command is generated, and jump is made to step S2.

In the above flowchart, a loop of steps S2 through S6 corresponds to the job by command DO. When the command is once issued, the data processing proceeds in accordance with the above routine. This loop is formed during a period that the address of a triangle wave in FIG. 18(a) gradually increases. The fact that condition code X1 holds in step S6 indicates that the address reaches the maximum value, and the horizontal sync signal arrives, and hence that an address (A91) of FIG. 18(a) has been obtained.

The fact that condition code X2 holds in step S4 indicates that the address reaches the maximum value when the horizontal sync signal is absent, and hence that an address (A92) of FIG. 18(b) has been obtained.

According to the flowchart for generating the video addresses, addresses having various phases with respect to the horizontal sync signal can be formed by altering the initial address.

It is evident to those skilled in the art that the combination of the network section with the processor units, network configuration of FIG. 7, combination of the processor units of FIG. 8, configuration of the host I/O of FIG. 9, use of the control memory of FIG. 10, configuration of the address generating section shown in FIG. 11, and configuration of the sequencer may be applied not only to image data processings, but also to ordinary data processings.

What is claimed is:

1. A digital video signal processing system comprising:
    a plurality of programmable processor units each having a pair of inputs receiving video signals and each for processing the video signals applied to said pair of inputs in accordance with a program and outputting the result of the processing;
    a network section having first inputs receiving the output signals from said plurality of programmable processor units and second inputs receiving a plurality of video signals from exterior, first outputs provided corresponding to said inputs of said plurality of programmable processor units and a plurality of second outputs for providing final output signals, said network section being capable of programmably supplying the signals received at said inputs to said plurality of programmable processor units and capable of providing any of the input signals as a final output signal; and
    the types of data processings by said programmable processor units and connection patterns of said programmable processor units as set up by said network section being both altered freely.

2. A digital video signal processing system according to claim 1, in which said inputs and outputs of said network section are interconnected through a matrix network, and crosspoints of said matrix network are programmably turned on and off by a network controller contained in said network section.

3. A digital video signal processing system according to claim 1, in which said plurality of programmable processor units each includes
    first sync separating means being coupled for reception with one of two types of digital video signals containing sync signals, through a delay line,
    second sync separating means being directly coupled for reception with the other of said digital video signals,
    data processing means coupled for reception with the separated data derived from said first and second sync separating means, and
    means for controlling a programmed operation of each of said data processing means in synchronism with the separated sync signals derived from said first and second sync separating means, and for controlling an amount of delay of said delay line to match the phases of said two different types of digital video signals.

4. A digital video signal processing system according to claim 1, in which said programmable processor units each includes arithmetic operation means serving as a comparator, at least two registers, and selector means for selecting one of the output signals of said registers and outputting the selected signal as an output signal of said programmable processor unit.

5. A digital video signal processing system according to claim 1, in which said programmable processor units each include a plurality of data processing means, control memory means storing command codes at memory locations allocated respectively for said data processing means in order to simultaneously apply the command data to said data processing means in response to sync signals, and a command decoder for decoding commands from an external program memory and writing the decoded commands to said control memory means.

6. A digital video signal processing system according to claim 1, in which said programmable processing units include each a host interface for setting up an electrical relation between an external host controller and an internal programmable data processing means, and an address controller for accessing an external program memory,
    said interface includes a first selector for selectively transferring the data from said host controller to first or second transfer registers, a second selector for selecting one of the output signals from said first and second transfer registers, and supplying the selected signal to said internal programmable data processing means and said address controller, and a selector controller receiving specific bits of said first and second transfer registers, and for controlling operating states of said first and second selectors in such a way that under conditions that said first selector electrically relates said first transfer register to said external host controller, said second selector electrically relates said second transfer register to said data processing means and said address controller, so that said external host controller has written data through said first selector to said first transfer register, and, when data is loaded into said specific bit of said first transfer register, said second selector electrically relates said first transfer register to said programmable data processing means and said address controller, and said first selector electrically relates said second transfer register to said host controller.

7. A digital video signal processing system according to claim 1, in which said programmable processor units each includes horizontal address generating means for producing a horizontal address of an external data memory by arithmetically operating an output data signal of a first incremental register and address data of said digital video signals, horizontal address comparing means for deciding whether or not the horizontal address from said horizontal address generating means is within an area determined by the contents of a comparison register, and said horizontal address comparing means producing a signal representative of the decision result, horizontal address selecting means for selecting and outputting one of the horizontal address from said horizontal address generating means and the output data signal from a replacement register, vertical address generating means for producing a vertical address of an external data memory by arithmetically operating an output data signal of a second incremental register and address data of said digital video signals, vertical address comparing means, for deciding whether or not the vertical address from said vertical address generating means is within an area determined by the contents of a comparison register, and said vertical address comparing means producing a signal representative of the decision result, vertical address selecting means for selecting and outputting one of the vertical address from said vertical address generating means and the output data signal from a replacement register, autoreplace control means receiving the area decision result signals from said horizontal and vertical address comparing means, when the horizontal and vertical addresses are outside said areas, said autoreplace control means controlling said horizontal and vertical address selector means to select and output the output data signals of corresponding horizontal and vertical replacement registers, and a look-up table receiving the data expressed by values of decimal part, which is contained in the address data outputted from said horizontal and vertical address selectors, and generating two dimensional interpolating coefficients for two dimensional address data expressed by values of integer.

8. A digital video signal processing system according to claim 1, in which said programmable processor units each includes an address controller for applying an address to an external program memory to read out program data therefrom, command latch means for latching the program data read out of said program memory, and a decoder decoding the program data of said latching means and controlling a clock controller to supply a clock signal to said command latch means in accordance with the decoded program data, thereby to stop supply of the clock signal.

9. A digital video signal processing system according to claim 1, in which said programmable processor units each includes an address controller for applying an address to an external program memory to read out program data therefrom, a program table prestoring the command data of specific address of said external program memory to which control jumps to, multiplexer means for selecting one of the output data of said program memory and said program table, command latch means for latching the program data read out of said program memory, and a decoder decoding the program data of said latching means and determining the selected data of said multiplexer means in accordance with the decoded program data.

10. A digital video signal processing system according to claim 1, in which said programmable processor units each includes programmable data processing means, prefetch means for consecutively generating addresses to read out program data from an external program memory for applying the read out program data to said programmable data processing means, first multiplexer means for providing a jump address from a jump address table as address data for altering the outputting of said prefetch means, a program table prestoring the command data of specific address of said external program memory to which control jumps to, second multiplexer means for selecting one of the output data of said program memory and said program table, command latch means for latching the program data read out of said program memory, and a decoder decoding the program data of said command latch means and, in accordance with the decoded program data, controlling said second multiplexer to latch in said command latch means the command data at said jump address of said program table, and further controlling said first multiplexer means to supply the jump address from said jump address table to said prefetch means.

11. A digital video signal processing system according to claim 10, in which said decoder responds to a condition code from said programmable data processing means to control said first multiplexer means so that the jump address outputted from jump address table is supplied to said prefetch means.

12. A digital video signal processing system according to claim 10, in which said decoder responds to a condition code from said programmable data processing means to control said second multiplexer means so that command data of the jump address outputted from jump address table is supplied to a command latch prefetch means, and further to control said first multiplexer means so that the jump address outputted from jump address table is supplied to said prefetch means.

* * * * *